(12) United States Patent
Erden et al.

(10) Patent No.: US 6,707,624 B2
(45) Date of Patent: Mar. 16, 2004

(54) METHOD AND APPARATUS FOR PREPROCESSING LOW FREQUENCIES IN PERPENDICULAR RECORDING

(75) Inventors: Mehmet Faith Erden, Pittsburgh, PA (US); Erozan Mehmet Kurtas, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/116,193

(22) Filed: Apr. 4, 2002

(65) Prior Publication Data

US 2003/0107831 A1 Jun. 12, 2003

Related U.S. Application Data

(60) Provisional application No. 60/339,002, filed on Dec. 7, 2001.

(51) Int. Cl.$^7$ ............................................. G11B 27/36
(52) U.S. Cl. ................................................. 360/31; 360/46
(58) Field of Search ............................. 360/32, 46, 51, 360/53, 65, 31; 369/69; 358/342

(56) References Cited

U.S. PATENT DOCUMENTS

| 4,085,427 | A | * | 4/1978 | Dunn | 360/77.05 |
|---|---|---|---|---|---|
| 4,736,355 | A | * | 4/1988 | Kanamaru | 369/59.15 |
| 4,811,262 | A | * | 3/1989 | White | 708/300 |
| 5,585,986 | A | * | 12/1996 | Parkin | 360/324 |
| 6,046,873 | A | * | 4/2000 | Hori et al. | 360/53 |

* cited by examiner

Primary Examiner—David Hudspeth
Assistant Examiner—Glenda P. Rodriguez
(74) Attorney, Agent, or Firm—Westman, Champlin & Kelly, P.A.

(57) ABSTRACT

A method of preprocessing low frequency components of a perpendicular read-back signal in a data storage system in order to reduce low frequency noise includes introducing a dominant known perturbation, to the perpendicular read-back signal, which masks the effects of other low frequency noise sources and leaves the read-back signal with one dominant low frequency noise component. The method then further includes removing the dominant known perturbation from the read-back signal to recover low frequency portions of the read-back signal in order to determine values of bits read from a storage medium. A perpendicular recording data storage system configured to implement the method is also disclosed.

20 Claims, 20 Drawing Sheets

TABLE 1

| Sector num | No tr | Hilbert | H-1024 | H-64 | H-16 | Our algo |
|---|---|---|---|---|---|---|
| 1 | 54 | 224 | 56 | 158 | 178 | 52 |
| 2 | 24 | 86 | 24 | 44 | 60 | 12 |
| 3 | 15 | 61 | 18 | 44 | 58 | 24 |
| 4 | 8 | 60 | 18 | 46 | 60 | 10 |
| 5 | 26 | 99 | 30 | 68 | 80 | 26 |
| 6 | 171 | 546 | 219 | 426 | 486 | 173 |
| 7 | 38 | 144 | 42 | 86 | 100 | 28 |
| 8 | 56 | 232 | 72 | 160 | 195 | 52 |
| 9 | 42 | 141 | 50 | 84 | 106 | 32 |
| 10 | 22 | 97 | 36 | 64 | 75 | 22 |
| Total | 456 | 1690 | 565 | 1180 | 1398 | 431 |
| Average BER | 0.001 | 0.0038 | 0.0013 | 0.0027 | 0.0032 | 0.00097 |

TABLE 2

| Sector num | No tr Adapts OFF | Our algo Adapts OFF | No tr Adapts ON | Our algo Adapts ON |
|---|---|---|---|---|
| 1 | 54 | 46 | 54 | 46 |
| 2 | 30 | 6 | 28 | 10 |
| 3 | 12 | 18 | 20 | 18 |
| 4 | 18 | 4 | 20 | 4 |
| 5 | 30 | 14 | 30 | 18 |
| 6 | 183 | 150 | 154 | 101 |
| 7 | 40 | 30 | 38 | 26 |
| 8 | 60 | 34 | 53 | 32 |
| 9 | 54 | 20 | 56 | 20 |
| 10 | 32 | 22 | 36 | 27 |
| Total | 513 | 344 | 489 | 302 |
| Average BER | 0.0012 | 0.00078 | 0.0013 | 0.00068 |

FIG. 7

TABLE 3

| Input bit stream | 1 | 1 | -1 | 1 | -1 | 1 | 1 | -1 | -1 | -1 | 1 | -1 | -1 |
|---|---|---|---|---|---|---|---|---|---|---|---|---|---|
| Decision of detector | 1 | 1 | 1 | 1 | 1 | 1 | 1 | 1 | 1 | 1 | 1 | 1 | 1 |
| Error sequence | 0 | 0 | 2 | 0 | 2 | 0 | 0 | 2 | 2 | 2 | 0 | 2 | 2 |

FIG. 12

TABLE 14

| Main branch | $l_1$ | $l_2$ | $l_3$ | $l_4$ | $l_5$ | $l_6$ | $l_7$ | $l_8$ |
|---|---|---|---|---|---|---|---|---|
| Branch 1 | $-l_1$ | $l_2$ | $l_3$ | $l_4$ | $l_5$ | $l_6$ | $l_7$ | $l_8$ |
| Branch 2 | $l_1$ | $-l_2$ | $l_3$ | $l_4$ | $l_5$ | $l_6$ | $l_7$ | $l_8$ |
| Branch 3 | $l_1$ | $l_2$ | $-l_3$ | $l_4$ | $l_5$ | $l_6$ | $l_7$ | $l_8$ |
| Branch 4 | $l_1$ | $l_2$ | $l_3$ | $-l_4$ | $l_5$ | $l_6$ | $l_7$ | $l_8$ |
| Branch 5 | $l_1$ | $l_2$ | $l_3$ | $l_4$ | $-l_5$ | $l_6$ | $l_7$ | $l_8$ |
| Branch 6 | $l_1$ | $l_2$ | $l_3$ | $l_4$ | $l_5$ | $-l_6$ | $l_7$ | $l_8$ |
| Branch 7 | $l_1$ | $l_2$ | $l_3$ | $l_4$ | $l_5$ | $l_6$ | $-l_7$ | $l_8$ |
| Branch 8 | $l_1$ | $l_2$ | $l_3$ | $l_4$ | $l_5$ | $l_6$ | $l_7$ | $-l_8$ |

TABLE 5

| Main branch | $l_1$ | $l_2$ | $l_3$ | $l_4$ | $l_5$ | $l_6$ | $l_7$ | $l_8$ |
|---|---|---|---|---|---|---|---|---|
| Branch 1 | $l_1$ | $l_2$ | $l_3$ | $l_4$ | $l_5$ | $l_6$ | $l_7$ | $-l_8$ |
| Branch 2 | $-l_1$ | $l_2$ | $l_3$ | $l_4$ | $l_5$ | $l_6$ | $l_7$ | $l_8$ |
| Branch 3 | $l_1$ | $-l_2$ | $l_3$ | $l_4$ | $l_5$ | $l_6$ | $l_7$ | $l_8$ |
| Branch 4 | $l_1$ | $l_2$ | $-l_3$ | $l_4$ | $l_5$ | $l_6$ | $l_7$ | $l_8$ |
| Branch 5 | $l_1$ | $l_2$ | $l_3$ | $-l_4$ | $l_5$ | $l_6$ | $l_7$ | $l_8$ |
| Branch 6 | $l_1$ | $l_2$ | $l_3$ | $l_4$ | $-l_5$ | $l_6$ | $l_7$ | $l_8$ |
| Branch 7 | $l_1$ | $l_2$ | $l_3$ | $l_4$ | $l_5$ | $-l_6$ | $l_7$ | $l_8$ |
| Branch 8 | $l_1$ | $l_2$ | $l_3$ | $l_4$ | $l_5$ | $l_6$ | $-l_7$ | $l_8$ |

FIG. 15

TABLE 6

| Main branch | $l_1$ | $l_2$ | $l_3$ | $l_4$ | $l_5$ | $l_6$ | $l_7$ | $l_8$ |
|---|---|---|---|---|---|---|---|---|
| Branch 1 | $l_1$ | $l_2$ | $l_3$ | $l_4$ | $l_5$ | $l_6$ | $-l_7$ | $l_8$ |
| Branch 2 | $l_1$ | $l_2$ | $l_3$ | $l_4$ | $l_5$ | $l_6$ | $l_7$ | $-l_8$ |
| Branch 3 | $-l_1$ | $l_2$ | $l_3$ | $l_4$ | $l_5$ | $l_6$ | $l_7$ | $l_8$ |
| Branch 4 | $l_1$ | $-l_2$ | $l_3$ | $l_4$ | $l_5$ | $l_6$ | $l_7$ | $l_8$ |
| Branch 5 | $l_1$ | $l_2$ | $-l_3$ | $l_4$ | $l_5$ | $l_6$ | $l_7$ | $l_8$ |
| Branch 6 | $l_1$ | $l_2$ | $l_3$ | $-l_4$ | $l_5$ | $l_6$ | $l_7$ | $l_8$ |
| Branch 7 | $l_1$ | $l_2$ | $l_3$ | $l_4$ | $-l_5$ | $l_6$ | $l_7$ | $l_8$ |
| Branch 8 | $l_1$ | $l_2$ | $l_3$ | $l_4$ | $l_5$ | $-l_6$ | $l_7$ | $l_8$ |

TABLE 7

| | | | | | | | | |
|---|---|---|---|---|---|---|---|---|
| Main branch (previous branch 7) | $l_1$ | $l_2$ | $l_3$ | $l_4$ | $-l_5$ | $l_6$ | $l_7$ | $l_8$ |
| Branch 1 (previous main branch) | $l_1$ | $l_2$ | $l_3$ | $l_4$ | $l_5$ | $l_6$ | $l_7$ | $l_8$ |
| Branch 2 (previous branch 3) | $-l_1$ | $l_2$ | $l_3$ | $l_4$ | $l_5$ | $l_6$ | $l_7$ | $l_8$ |
| Branch 3 (previous branch 4) | $l_1$ | $-l_2$ | $l_3$ | $l_4$ | $l_5$ | $l_6$ | $l_7$ | $l_8$ |
| Branch 4 (previous branch 5) | $l_1$ | $l_2$ | $-l_3$ | $l_4$ | $l_5$ | $l_6$ | $l_7$ | $l_8$ |
| Branch 5 (previous branch 6) | $l_1$ | $l_2$ | $l_3$ | $-l_4$ | $l_5$ | $l_6$ | $l_7$ | $l_8$ |
| Branch 6 (previous branch 8) | $l_1$ | $l_2$ | $l_3$ | $l_4$ | $l_5$ | $-l_6$ | $l_7$ | $l_8$ |
| Branch 7 (previous branch 1) | $l_1$ | $l_2$ | $l_3$ | $l_4$ | $l_5$ | $l_6$ | $-l_7$ | $l_8$ |
| Branch 8 (previous branch 2) | $l_1$ | $l_2$ | $l_3$ | $l_4$ | $l_5$ | $l_6$ | $l_7$ | $-l_8$ |

FIG. 16

METHOD AND APPARATUS FOR PREPROCESSING LOW FREQUENCIES IN PERPENDICULAR RECORDING

CROSS-REFERENCE TO RELATED APPLICATION

This application claims priority from U.S. Provisional Application No. 60/339,002, filed Dec. 7, 2001, and entitled "PREPROCESSING LOW FREQUENCIES IN PERPENDICULAR RECORDING".

FIELD OF THE INVENTION

The present invention relates generally to the field of perpendicular recording in data storage systems. More particularly, but not by limitation, the present invention relates to methods and apparatus for preprocessing perpendicular recording read-back signals in order to improve Bit-Error-Rate (BER) performance which is adversely affected by low frequency noise sources in the perpendicular recording read-back signals.

BACKGROUND OF THE INVENTION

Recording medium for recording data include magnetic discs, optical discs, magneto-optical discs, and magnetic tapes, for example. When data is digitally recorded on, or read-back from, a recording medium, it is preferable that the data is recorded at a high density Because of the enormous increase in demand for data storage capacity, research on general recording systems has resulted in the investigation of many potential methods and architectures for increasing the capacity of storage media. This is also true for magnetic recording, for example in magnetic disc drive data storage systems in which architectures which may result in a higher areal density are being explored.

One of the recent architectures in the field of magnetic recording, which is believed to have more potential than the already existing longitudinal recording architectures, is perpendicular recording. In longitudinal recording, the magnetic medium on the disc is magnetized parallel to the surface of the disc. In perpendicular recording, however, the medium is magnetized perpendicular to the surface of the disc.

In addition to its potential to achieve higher areal densities, the specific nature of perpendicular recording also brings its own difficulties. One of the main difficulties relates to low frequency components of the perpendicular read-back signals. A significant amount of the data in read-back signals is at low frequencies. In other words, there is a considerable amount of information about the written bits at the low frequency portion of the read-back signal. However, a significant amount of dominant noise sources is also located at low frequencies. Further, since the direct current (DC) component of a perpendicular read-back signal causes unwanted DC-coupling in the system, it is typically necessary to get rid of the DC content of the signal. Given that the significant amount of dominant noise sources is located at low frequencies, and that it is typically preferable to eliminate the DC content of the signal, it might seem to be beneficial to also get rid of the low frequency components of the signal. However while filtering out the low frequency components, a considerable amount of information about the data is also lost. Thus, there is a trade-off between removing the DC content and the dominant portions of the low frequency noise components, and losing some information about the data which might be used to increase system performance.

An ideal way to deal with this problem would be to use all kinds of information about the perpendicular channel, the data, and the noise to retrieve the data from the read-back signal. However, the dominant noise sources in the system are not Gaussian, and they are data dependent. For example, Base-Line Wander (BLW) and media noise are dependent on on-track data, while the neighboring track interference depends on data at adjacent tracks. The data dependency of noise and the non-Gaussian shape of its power spectrum makes it very difficult to come up with signal processing algorithms to effectively deal with the noise. Even if it can be done, this type of algorithm is generally the responsibility of the detection block of the electronics, which creates difficulty in the design of the detection block, likely resulting in a very complex algorithm and design.

Previously, the idea of transforming a perpendicular signal to a longitudinal one has been explored. Several factors served as motivation for this transformation. First, there generally is not a DC coupling problem or a problem with the low frequency components of read-back signals in longitudinal architectures. Second, transforming the perpendicular channel to a longitudinal one to get rid of DC coupling also makes use of existing longitudinal channel designs possible. Third, the noise at low frequencies will also be transformed, potentially allowing the existing longitudinal channel design to deal with the new longitudinal looking channel.

This idea of transforming a perpendicular signal to a longitudinal one does not consider any noise analysis in the system, and only expects the existing longitudinal channel designs to handle the new transformed noise effects in the system. However, while transforming perpendicular to longitudinal, some noise in the system is boosted, and/or some valuable portion of information about the data is lost. For this reason, transforming the perpendicular signals to longitudinal looking signals and applying the existing longitudinal architectures is likely to result in a worse Bit-Error-Rate (BER) performance than would result if the signal had not been transformed.

Consequently, an algorithm which both performs better than these different realizations of the idea of transforming perpendicular to longitudinal, and which also improves the overall system performance, would be a significant improvement in the art.

SUMMARY OF THE INVENTION

Embodiments of the present invention relate to methods and apparatus for preprocessing perpendicular read-back signals in order to improve the BER by removing low frequency noise while preserving low frequency signal content which contains information useful in determining values of bits read from a storage medium.

The present invention addresses the aforementioned problems by providing a method and apparatus for preprocessing low frequency components of a perpendicular read-back signal in a data storage system in order to reduce low frequency noise. First, a dominant known perturbation is introduced into the system. For this purpose, a dominant high-pass pole can be chosen. This high-pass pole masks the effects of other low frequency noise sources leaving the system with one dominant low frequency noise component which is artificially introduced into the system and is perfectly known. In presence of this high-pass pole, the system can be seen to have only the BLW effect produced by this pole. Then, the artificially introduced dominant perturbation is removed from the system.

In one embodiment, a method of the present invention includes introducing a dominant known perturbation, to a perpendicular read-back signal, which masks the effects of other low frequency noise sources and leaves the read-back signal with one dominant low frequency noise component. The method then further includes removing the dominant known perturbation from the read-back signal to recover low frequency portions of the read-back signal in order to determine values of bits read from a storage medium.

These and various other features as well as advantages which characterize embodiments of the present invention will be apparent upon reading of the following detailed description and review of the associated drawings.

BRIEF DESCRIPTION OF THE DRAWINGS

FIG. 2-1 is a plot illustrating concepts utilized in the method of the present invention.

FIG. 2-2 is a flow diagram illustrating the method of the present invention.

FIG. 7 shows tables which illustrate concepts of the present invention.

FIG. 12 shows a table which illustrates concepts useful in discussing the present invention.

FIGS. 15 and 16 show tables which illustrate concepts of the present invention.

FIGS. 17-1, 17-2 and 17-3 are block diagrams illustrating embodiments of a method of error detection and cancellation in accordance with some embodiments of the invention.

DETAILED DESCRIPTION OF ILLUSTRATIVE EMBODIMENTS

Figure 1:
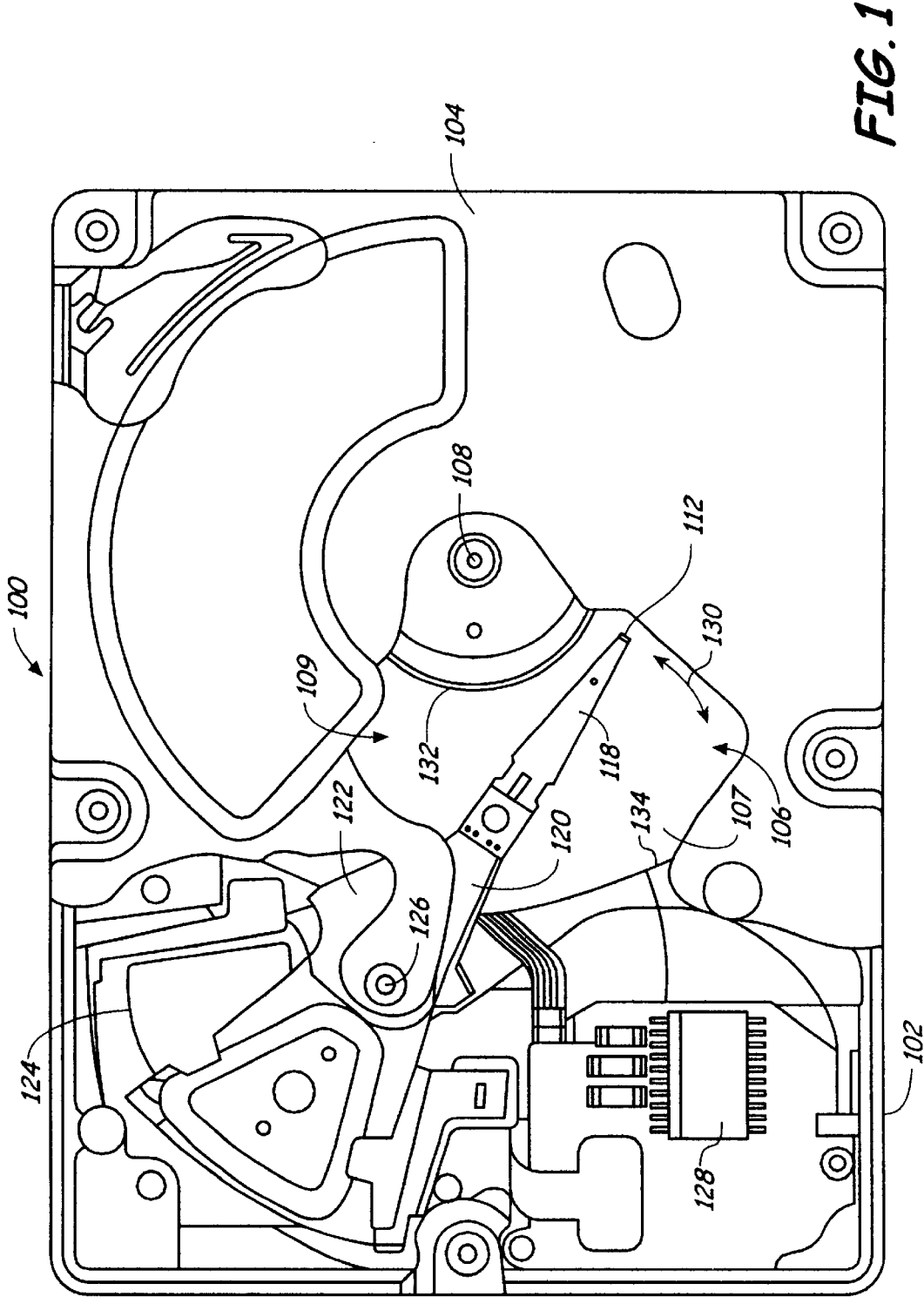
FIG. 1 is a plan view of a disc drive in accordance with embodiments of the present invention.

FIG. 1 is a plan view of a disc drive 100 which includes a housing with a base 102 and a top cover 104 (sections of top cover 104 are removed for clarity). Disc drive 100 further includes a disc pack 106 which is mounted on a spindle motor (not shown). Disc pack 106 includes a plurality of individual discs 107 which are mounted for co-rotation about central axis 108. Each disc 107 has an associated product head 112 which carries one or more read and write transducers (read and write heads) for communicating with disc surface 109. Each product head 112 is supported by a suspension 118 which is in turn attached to a track accessing arm 120 of an actuator assembly 122. Actuator assembly 122 is rotated about a shaft 126 by a voice coil motor 124, which is controlled by servo control circuitry, to move head 112 in an arcuate path 130 between a disc inner diameter 132 and a disc outer diameter 134.

Also shown in FIG. 1 is circuitry 128 which diagrammatically represents circuitry associated with the channel architecture used in processing signals to be written to or read from the disc or media surface. The position in which circuitry 128 is located need not be as shown in FIG. 1, but instead, the position of circuitry 128 shown in FIG. 1 is provided as an example for discussion purposes. Further, disc drive 100 is intended to represent any of a variety of data storage devices in which the methods and apparatus of the present invention can be implemented. For example, in one embodiment, disc drive 100 is a magnetic disc drive utilizing perpendicular recording techniques and components. However, in other embodiments, disc drive 100 can be other types of magnetic disc drive, or can be other types of disc drive such as an optical disc drive, a magneto-optical disc drive, etc. The methods and apparatus disclosed herein can also be used in other data storage devices, for example in magnetic tape storage devices.

As described in the background section, dominant noise sources in a perpendicular read-back signal, such as provided to circuitry 128 by product head 112 in perpendicular recording embodiments, are located at low frequencies along with significant portions of information contained in the read-back signal. To minimize or reduce the effects of these dominant noise sources on the system performance (for example, to improve the BER), methods and apparatus are disclosed which introduce a dominant known perturbation into the system or into the read-back signal. For example, for this purpose, a dominant high-pass pole can be added to the system. The aim of this high-pass pole is to mask the effects of other low frequency noise sources, leaving the system with one dominant low frequency noise component which is artificially introduced into the system and is perfectly known. In presence of this high-pass pole, the system can be seen to have only the Base-Line Wander (BLW) effect produced by this pole. Then, the artificially introduced dominant perturbation is removed from the system (i.e., is removed from the read-back signal).

Figures 1, 2:
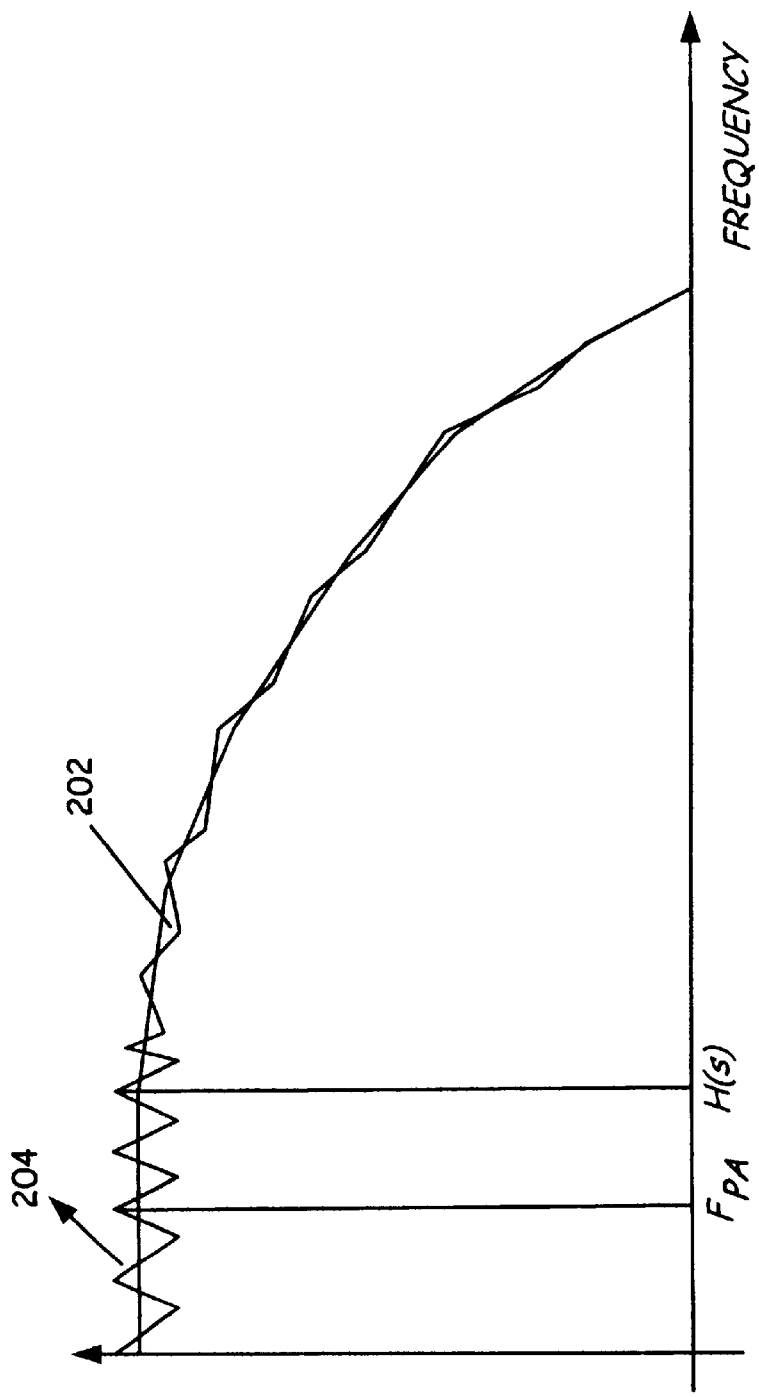
Figure 2:
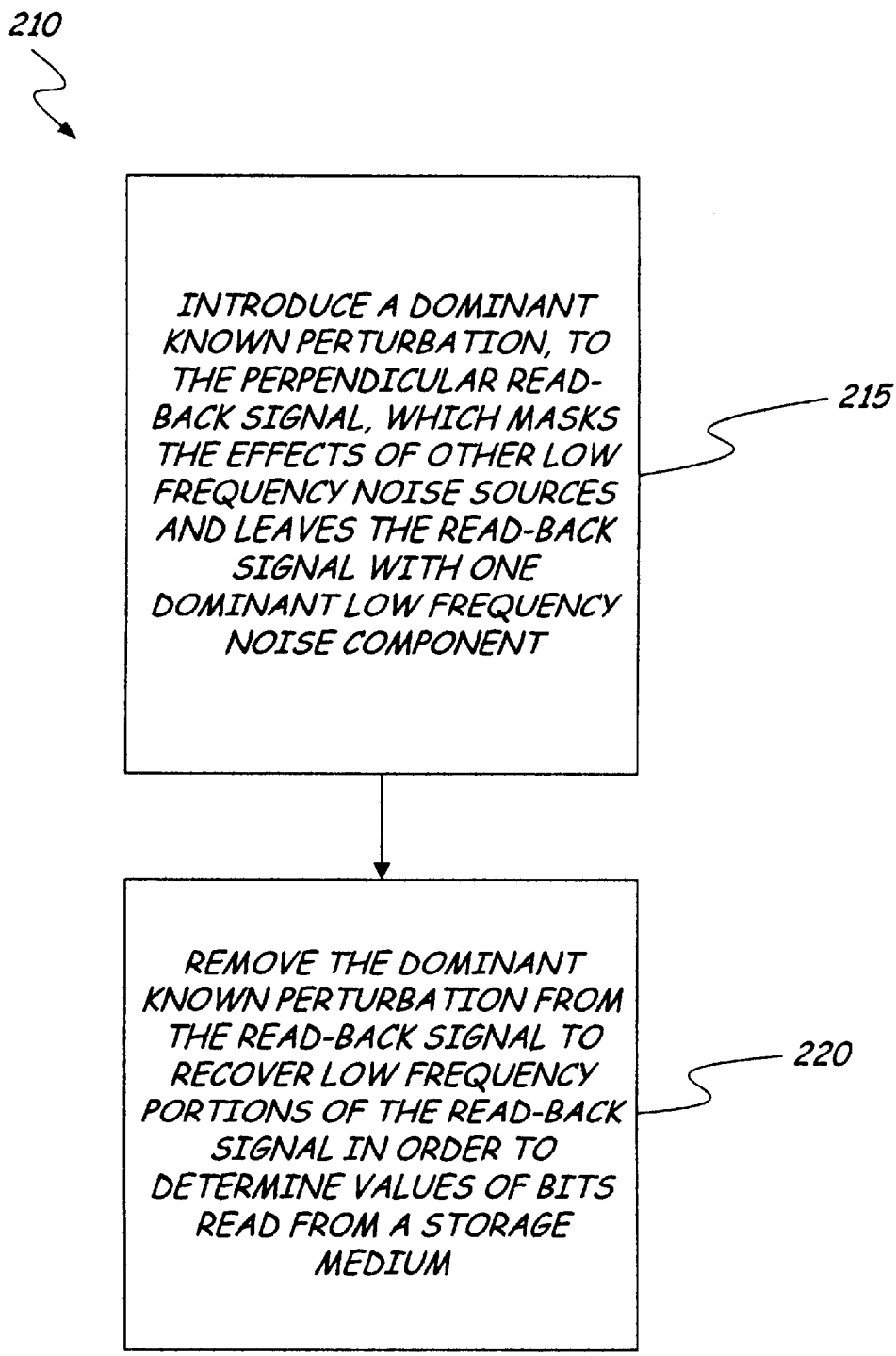

The idea behind the proposed algorithm can also be visually seen in the plot shown in FIG. 2-1. In this plot, perpendicular data is represented by curve 202, while low frequency noise is represented at 204. In FIG. 2-1, the cut-off frequency of the high pass filter H(s) is shown in relation to a typical preamplifier cut-off frequency $F_{PA}$. When a major portion of the low frequency noise 204 is filtered out by the high pass filter H(s), the dominant low frequency effect in the system comes from the high pass pole of H(s). Since one can recover the high pass pole effect of H(s), the data can be obtained relatively free from the dominant part of the low frequency noise effects.

Focussing on the general idea presented above, a first step 215 (shown in the flow diagram 210 of FIG. 2-2) is to insert a dominant high-pass pole in the system. It can be beneficial for the high-pass filter to have a very simple structure, and to have very sharp transition at its cut-off frequency. Further, the filter should generally not boost any part of the frequency content of the read-back signal. For these reasons, in one exemplary embodiment, the high-pass filter is an Infinite-Impulse-Response (IIR) filter of the form shown in Equation 1:

$$H(z) = 1 - \frac{m}{1-(1-m)z^{-1}} \quad \text{Equation 1}$$

where H(z) is the z-domain representation of the filter. By choosing its parameter m appropriately a dominant high-pass pole can be introduced in the system. As H(z) is a high-pass filter, it gets rid of low frequency parts of the read-back signal, including the DC content. Thus, it solves the DC-coupling problem. However, this filter also gets rid of the data component at low frequencies, which has to be recovered. It is important to note that the IIR high pass filter form shown in Equation 1 is but one example of a high pass filter which can be used in the methods and apparatus of the present invention.

A second step 220 is to compensate the effect of the artificially introduced dominant BLW which is the result of the high-pass pole of H(z). The model (first order IIR) of H(z) and the position of its high-pass pole (the high-pass pole of the filter is uniquely determined by its parameter m) are known. The filter L(z) which compensates the effect of H(z) will be a low-pass filter, and should be first order IIR to have an identical behavior with that of H(z). Thus, in an embodiment in which H(z) is of the form shown in Equation 1, L(z) can be of the form shown in Equation 2:

$$L(z) = \frac{k}{1-(1-k)z^{-1}} \quad \text{Equation 2}$$

where its parameter k depends on m in Equation 1.

It is not only the model of the filters themselves which are matched, but also the inputs of H(z) and L(z) are also matched. The input of H(z) is the convolution of the input bits with the channel impulse response. In order to have a similar input for L(z), the decisions from the detector are obtained, as they are the recovered input bits. Those decisions are then convolved with the estimate of the perpendicular channel impulse.

Figure 3:
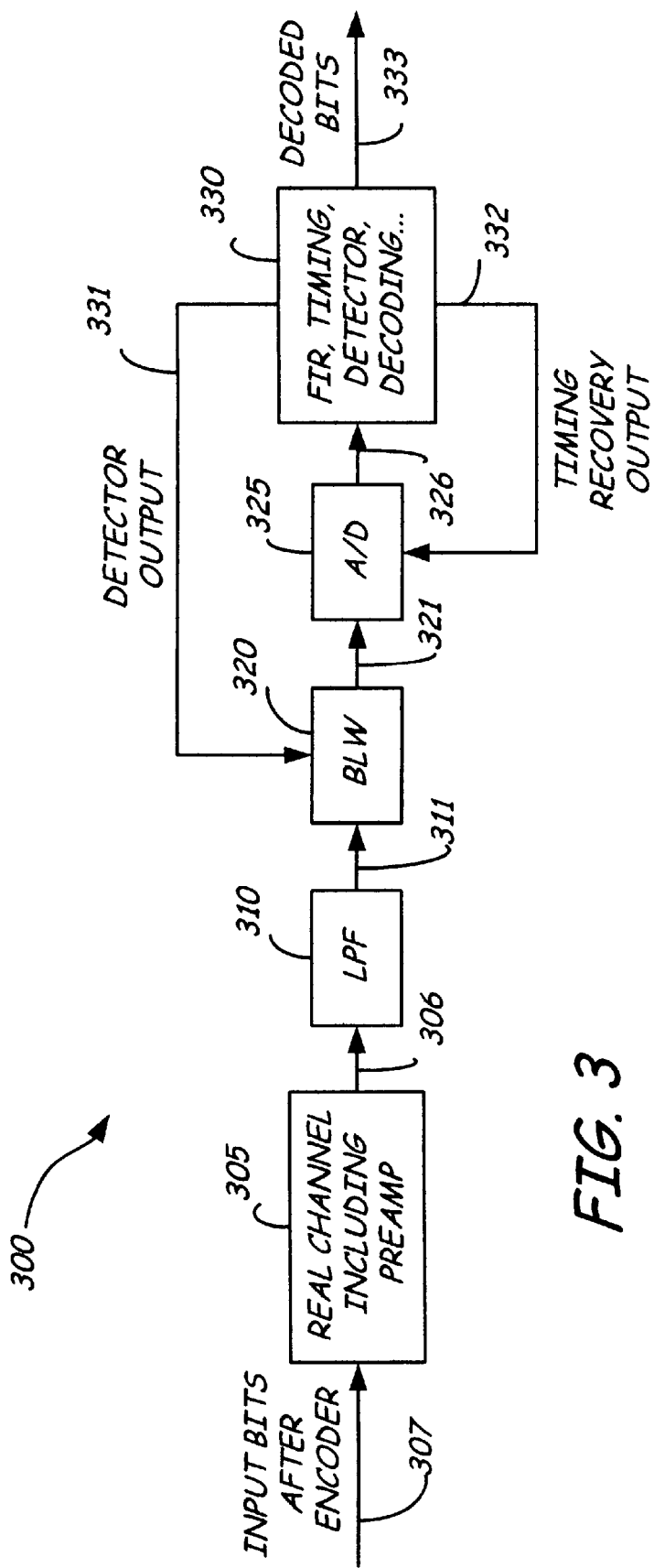
FIG. 3 is a block diagram illustrating an implementation of a signal processing system in which the method of the present invention is implemented.

Turning now to FIG. 3, shown are read circuitry or architecture portions 300 of circuitry 128 for embodiments of the disc drive data storage system of the invention. As shown in FIG. 3, circuit 300 includes a channel 305 which receives input bits 307 from an encoder (not shown). The channel output 306 is provided to low pass filter (LPF) 310 for filtering, and the filtered output 311 of LPF 310 is provided to BLW block or circuitry 320 in which some or all of the preprocessing methods disclosed herein are implemented in some embodiments of the invention. In the proposed algorithm, the BLW block first introduces a known dominant BLW in the system, then attempts to cancel it.

The output 321 of the BLW block 320 is provided to analog-to-digital (A/D) converter 325 for digitization. The digitized signals 326 are provided to circuitry 330, which represents other typical circuits or functions including finite impulse response (FIR) functions, timing functions, detector functions, decoding functions, etc. For example, a detection circuit or function implemented in circuitry 330 provides a detector output 331 which is used as an input to BLW block 320 as will be discussed in greater detail. Also, a timing circuit or function implemented in circuitry 330 provides a timing recovery output 332 which is used as an input to A/D block 325. Circuitry 330 also ultimately provides as an output decoded bits 333.

Figure 4:
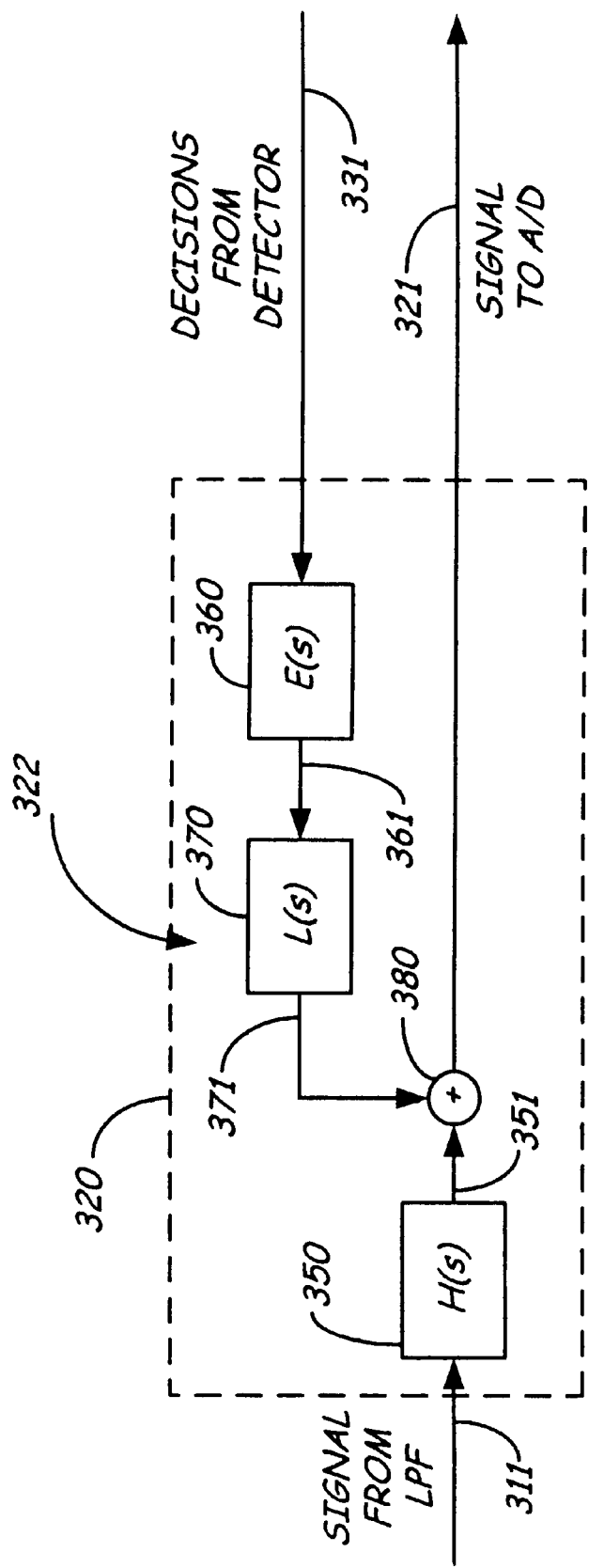
FIG. 4 is a block diagram illustrating in greater detail the Base-Line Wander (BLW) block, shown in FIG. 3, in which the method of the present invention can be implemented.

Referring now to FIG. 4, one embodiment of the BLW block 320 of circuit 300 is shown and discussed in greater detail. In FIG. 4, high pass filter H(s) 350 corresponds to the high-pass filter discussed above, but can also correspond to other high pass filter implementations. The E(s) block or circuit 360 represents circuitry or functions which estimate the perpendicular channel impulse response. The L(s) block or circuit 370 represents the low-pass filter discussed above, but can also correspond to other low pass filter implementations. The E(s) and L(s) functions are implemented in a feedback loop 322. In FIG. 4, the filters are represented with their Laplace transform notations (H(s), E(s), L(s)) instead of their z-transform versions (H(z), E(z), L(z)) to indicate that those filters are applied in the continuous analog domain in this embodiment.

In FIG. 4, the H(s) block 350 receives as an input signal 311 from LPF 310 (FIG. 3), and provides filtered signal 351 as an output. The E(s) block 360 receives as an input detector output 331, which is decisions from the detector, and provides output 361 in response. L(s) block 370 uses E(s) block output 361 to generate filtered signal 371. Signals 351 and 371 are combined using adder 380 to generate BLW block output 321.

In summary of FIGS. 3 and 4, the algorithm proposed first applies a high-pass filter to mask any low frequency noise effects. Then, by using the decisions from the detector (which are the decisions of the input bit stream), the BLW block 320 first gets the estimation of the read-back signal after the channel, and then corrects the effect of the high-pass pole which has been artificially introduced into the system. This is discussed below in greater detail.

Different Embodiments of the Method and Apparatus

In order to get a better estimate for the perpendicular channel, one might have to use an E(s) circuit or function (FIG. 4) with a huge number of tabs. However, it may not be practical to implement such a huge filter in the analog domain. For this reason, it can be beneficial to implement the E(s) and L(s) circuits or functions 360 and 370 in the digital domain. When E(s) is taken in the digital domain after equalization, it also helps reduce the delay between the detector decisions and the signal at the output of FIR (the equalizer). Therefore, the circuits shown in FIGS. 3 and 4 can be modified and realized in different implementation embodiments such as in portions of circuits 400 and 450 shown in FIGS. 5 and 6. Circuits 400 and 450 are alternate implementations of circuit 300 shown in FIG. 3, with the same or similar functions labeled the same in each of these FIGS.

Figure 5:
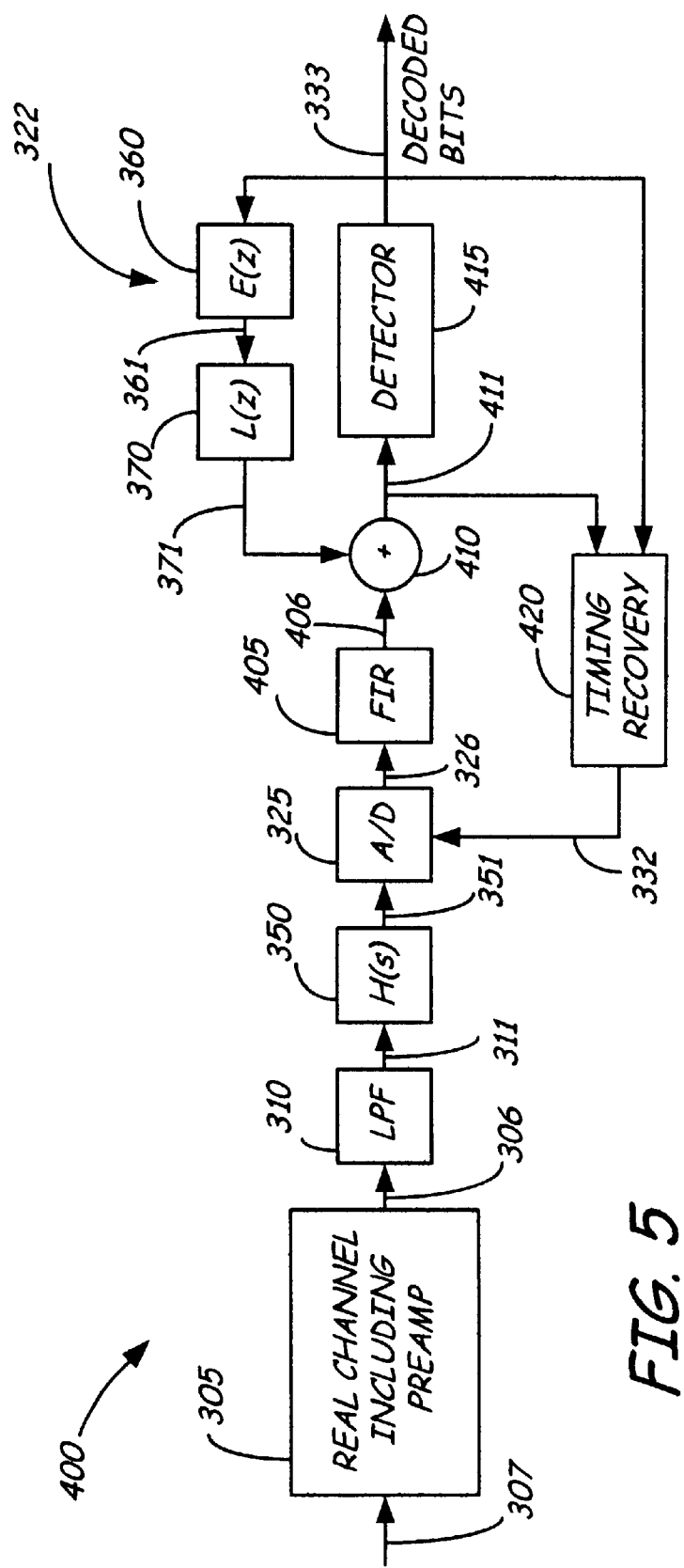
FIG. 5 is a block diagram illustrating a hybrid analog/digital implementation of the system shown in FIG. 3, including the method of the present invention.
Figure 6:
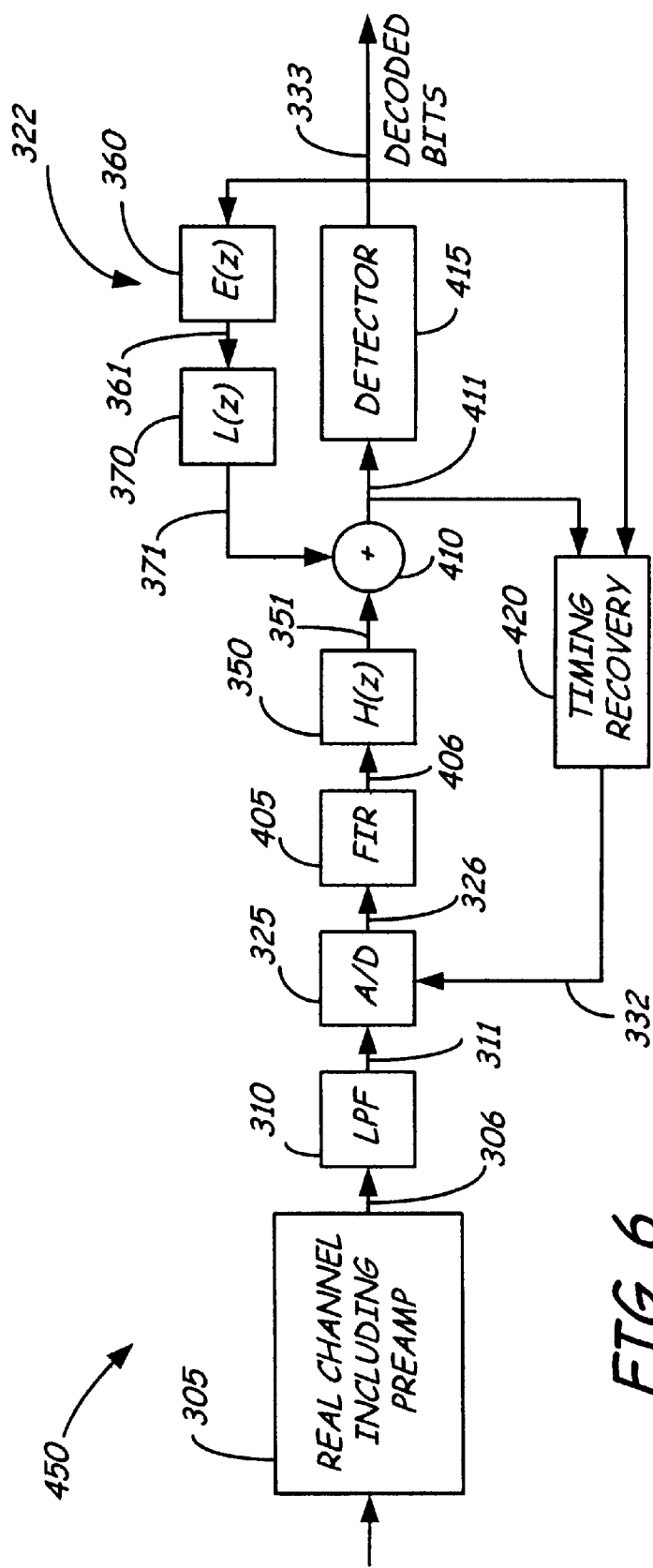
FIG. 6 is a block diagram illustrating a digital implementation of the system shown in FIG. 3, including the method of the present invention.

In FIGS. 5 and 6, the circuit blocks or functions H(s) (or H(z)) 350, E(z) 360 and L(z) 370 correspond to identically numbered circuit blocks or functions shown in FIG. 4. Some differences between the circuit architectures shown in FIGS. 5 and 6 in comparison to the analog implementation shown in FIG. 4 (along with FIG. 3) include the fact that in FIGS. 5 and 6, E(z) 360 is equal to the target response, and L(z) is the digital implementation of L(s). Additionally, in FIG. 6, the high-pass filter H(z) is also implemented digitally along with E(z) and L(z).

Circuit 400 shown in FIG. 5 is a hybrid implementation of the concepts of the invention, with H(s) 350 being implemented in the analog domain, while E(z) and L(z) 360 and 370 are implemented in the digital domain. From the input bits 307 provided by a decoder, through output 311 of LPF 310, circuit 400 is configured and functions the same or similar to circuit 300 shown in FIG. 4. The output 351 from high pass filter function H(s) 350 is digitized by A/D converter 325. The digitized output 326 of A/D converter 325 is input into FIR 405, and the output 406 from FIR 405 is provided as a first input to adder 410. The adder output 411 is provided to detector circuit or function 415, which provides as an output decoded bits 333 similar to the identically numbered output in FIG. 3. The decoded bits are also provided as an input to a feedback path including E(z) and L(z) circuits or functions 360 and 370, with the output 371 of the LPF function L(z) 370 being provided as the second input to adder 410. The decoded bits 333 from detector 415 are also provided to timing recovery circuit 420 for use in generating the timing recovery output 332.

In the embodiment of the digital implementation of circuit 300 provided by circuit 450 shown in FIG. 6, the output 326 of A/D converter 325 is provided directly to FIR 405. The output of FIR 405 is then provided to high pass filter function H(z) 350. The filtered output 351 of H(z) is then provided as the first input to adder 410, with the output 411 of the adder being provided to detector 415. Decoded bits 333 from the detector are provided to a feedback path including E(z) and L(z) circuits or functions 360 and 370, with the output 371 of the LPF function L(z) 370 being provided as the second input to adder 410. The decoded bits 333 from detector 415 are also provided to timing recovery circuit 420 for use in generating the timing recovery output 332.

The advantage of the digital implementation of the algorithm shown in FIG. 6 against its hybrid implementation shown in FIG. 5 is that all parts of the algorithm are implemented digitally, thus resulting in less implementation cost. However, in the hybrid implementation case the low frequency part, including the DC content of the read-back signal, was first filtered out. Thus, in the hybrid case, it is made sure that no DC coupling problem exists at the input of the A/D converter 325.

Simulation Results and Data

Simulations of the concepts of the invention have been conducted with real signals. The results were obtained by integrating the hybrid implementation of the proposed algorithm (circuit 400 shown in FIG. 5) into a software channel. The real read-back signal was obtained by first deciding on the bit stream to be processed, writing it onto the recording material, and then reading it back. During this process a head and media pair which is used for testing purposes was utilized. This read-back signal was then plugged into the software channel to test the inventive method.

In the read-back signal, the oversampling ratio was 9, and the normalized density $N_d$ of the perpendicular recording was 1.5. We obtain results for the first 10 sectors. In Tables 1 and 2 shown in FIG. 7, the number of errors after the Viterbi Algorithm are shown. The cases shown in tables correspond to the following:

no tr: Corresponds to using none of the preprocessing techniques and transforms described herein.

Hilbert: Corresponds to using the Finite-Impulse-Response (FIR) representation of a Hilbert transform of the type known in the art and as explained in literature. We chose the Hilbert FIR as a representation of the idea of transforming perpendicular signals to longitudinal looking ones.

H-1024: Corresponds to using only the high-pass filter H(s) with parameter m=1/1024 at the hybrid implementation of the proposed algorithm in FIG. 5 In other words we use the high-pass filter in place of the FIR representation of Hilbert Transform.

H-64: Corresponds to using the same high-pass filter H(s) this time with parameter m=1/64.

H-16: Corresponds to using the same H(s) with parameter m=1/16.

Our algo: Corresponds to hybrid implementation of our algorithm with parameters m=1/1024 and k=1/64.

Table 1 illustrates the number of errors for each sector, total number of errors, and BER for different cases. Table 1 shows the case where we used the programmable target of length 2 (i.e., GPR2) as the target response. We calculate the optimum target response and the equalizer coefficients using the first sector. Then we don't change them and process the next 9 sectors using those optimum target and equalizer coefficients.

As can be seen from this table, the performance of the Hilbert transform is very bad compared to the no transform case. In other words, by using the Hilbert transform method, considerable performance is lost compared to not using this transform. Let's now look at the cases when we use the high-pass filter H(s). The filter shown as H-1024 has the lowest high-pass cut-off frequency, and the one shown as H-16 has the highest cut-off frequency. As we increase the cut-off frequency, we filter out more low frequency parts, and we lose more information about the data. That is why we have more errors if we increase the cut-off frequency. When the cut-off frequency is very small, the performance is very close to having no transform, and when we increase the cut-off frequency the performance approaches to that of Hilbert. Thus, the performance of H(s) interpolates the performances between no transform and Hilbert. When looking at the performance of the algorithm of the present invention, it can be seen that it is even better than the one corresponding to having no transform. The reason is, we have the H(s) in the architecture of that method, but we also have a compensation part to correct the high-pass pole effect of the H(s). This extra compensation circuit improves the performance.

For the second experiment, we fixed the target response to [1 1], and compared only the no transform case and the algorithm of the present invention. The results are shown in Table 2 which shows the number of errors for each sector, total number of errors, and BER for different cases. Equalizer coefficients are adopted based on the received symbols. More specifically, in Table 2, "Adapts OFF" means that the equalizer coefficients are calculated using the first sector and then fixed, and the same equalizer is used for the next 9 sectors. However, in the "Adapts ON" case, we calculated the equalizer coefficients separately for each sector. In other words, in the "Adapts ON" case we find the equalizer coefficients for each sector separately, instead of using the one obtained for the first sector. From this table, it can be seen that the "Adapts ON" case performs better than the "Adapts OFF" case for both the no transform case and for the method of the present invention. It is also concluded that the method of the present invention performs better than the no transform case in both "Adapts OFF" and "Adapts ON" situations.

A comparison of Tables 1 and 2 shows that the no transform case performs better for a programmable (i.e., GPR2) target than it does when fixing the target. This is an expected result. However, the situation is just the opposite for the algorithm of the present invention. In other words, using the disclosed algorithm, we achieve a better performance figure if we fix the target. The reason for this is, in the GPR2 case, the target is designed assuming that there will be no terms to be added between the equalizer and the detector. However, in the method of the present invention, the compensation circuit for the dominant high-pass pole is added after the equalizer (see FIG. 5). In fixed target situation, the equalizer tries to equalize the channel to the fixed target, then the compensation part of the algorithm of the present invention gets rid of the effect of the dominant high-pass pole in the system. Thus, with the fixed target everything is consistent.

Potential Error Propagation

There is feedback in the proposed architectures, in FIGS. 3, 5 and 6. This feedback path produces a potential error propagation problem, and here we will address this problem. For discussion purposes, the proposed architectures are simplified, and an analysis of the error propagation in the simplified architecture is provided.

Figure 8:
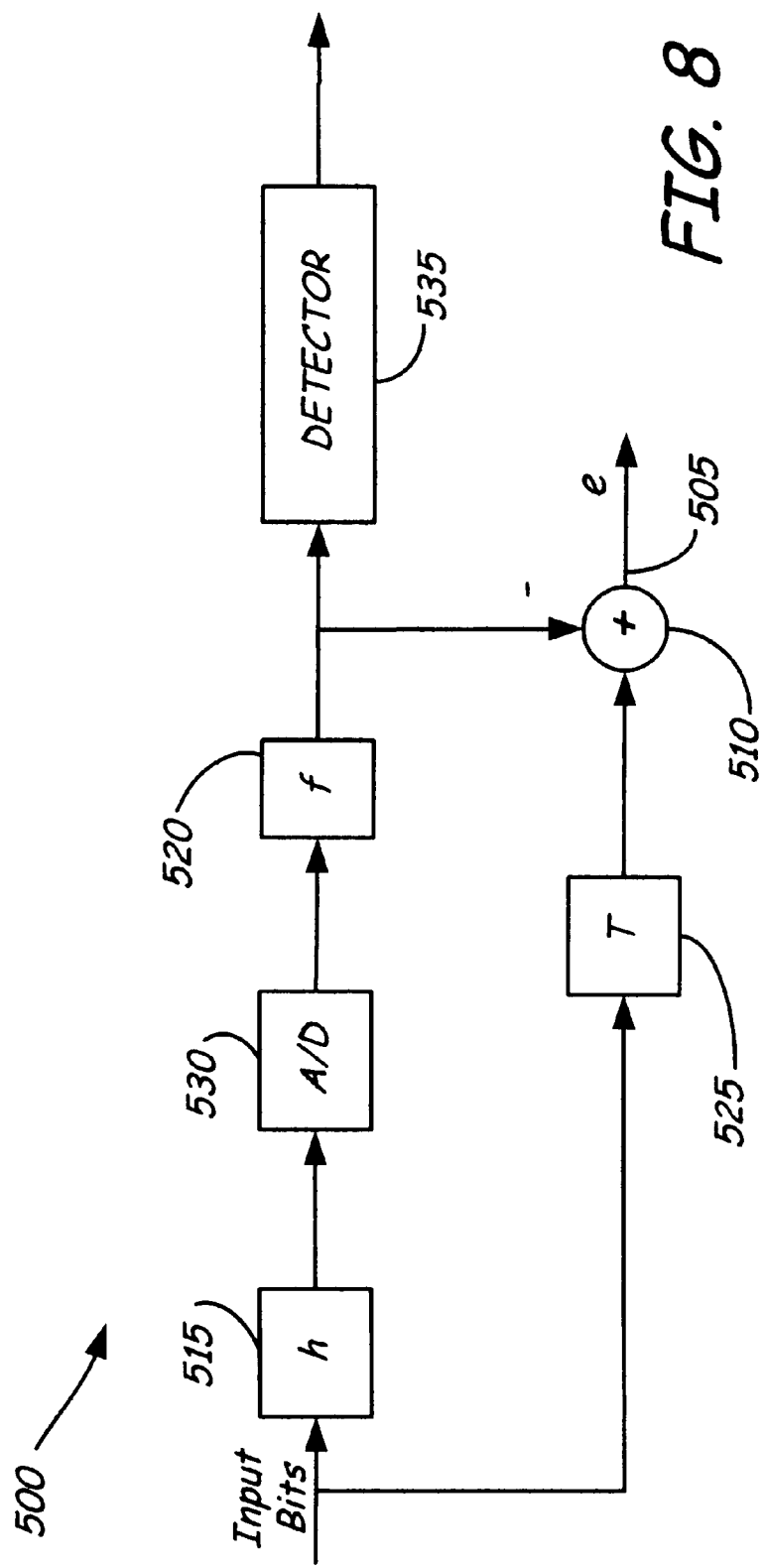
FIG. 8 is a block diagram illustrating an architecture which can be used for the target response filter and the FIR filter in embodiments of the present invention.

Referring to circuit 500 shown in FIG. 8, assume that there was no high-pass pole and no low frequency noise sources in the system. Then, the channel equalizer and the target response can be designed to minimize the error "e" 505 provided at the output of adder 510. In FIG. 8, "h" 515 corresponds to the real channel, "f" 520 represents the FIR filter for the channel equalizer, and "T" 525 stands for the target response. With the input bits as an input, the real channel h 515 feeds A/D 530, the output of which is provided to FIR filter f 520. The output of FIR filter f 520 is provided to detector 535 and as an input to adder 510.

Figure 9:
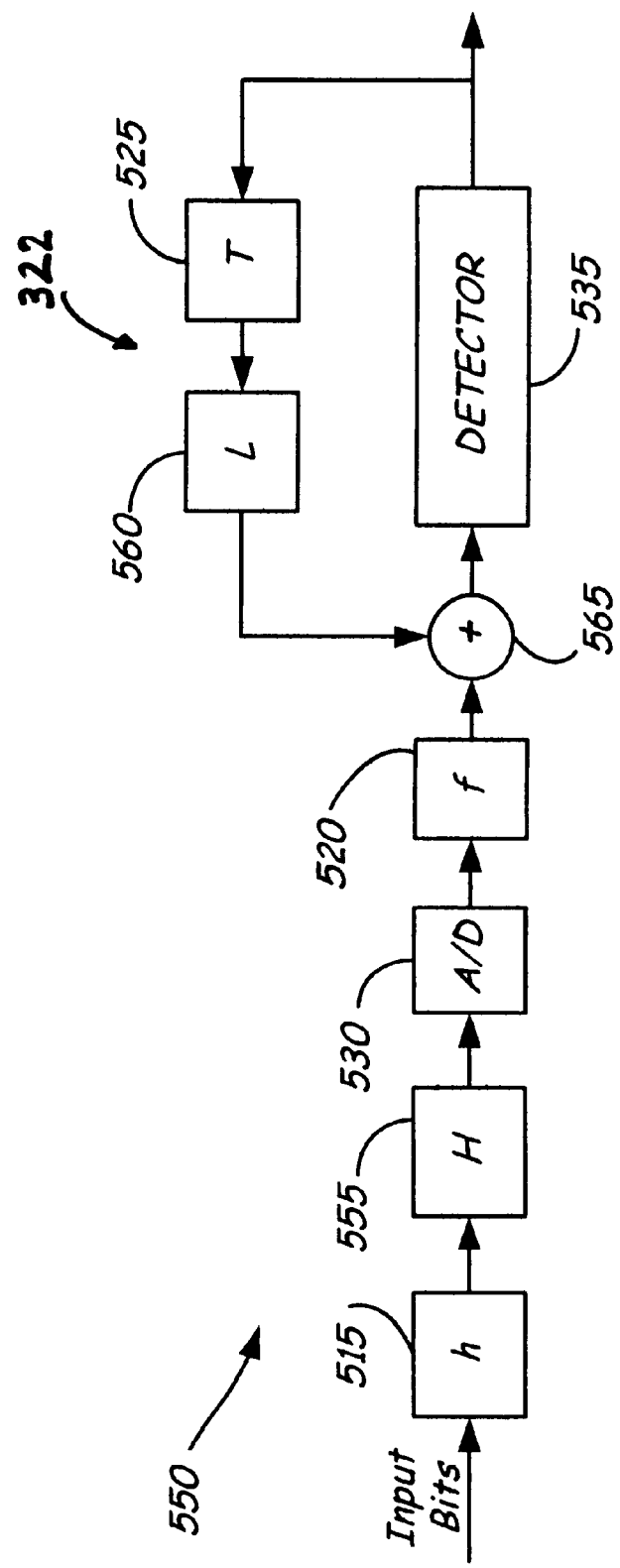
FIG. 9 is a block diagram illustrating a hybrid analog/digital implementation of the circuitry shown in FIG. 8.
Figure 10:
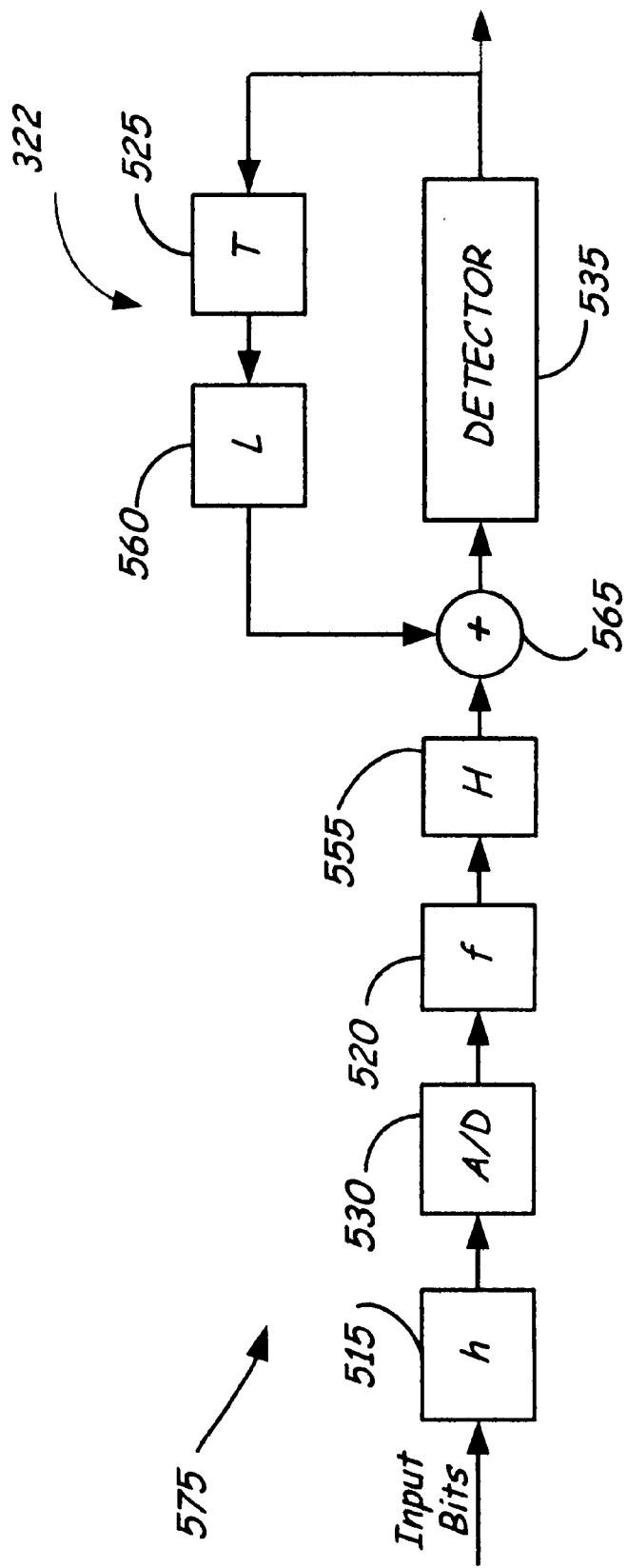
FIG. 10 is a block diagram illustrating the circuitry shown in FIG. 9, but with the high pass filter implemented in the digital domain.

In case there is preamp high pass pole and also other low frequency noise sources present in the system, we show the hybrid architecture circuit 550 in FIG. 9. In this hybrid structure, the filter H (shown at 555) is inserted between real channel h 515 and A/D 530. Also, the low pass filter L (shown at 560) and the target response 525 are included in a feedback loop 322 between the output of detector 535 and adder 565. From FIG. 9, the filter H 555 can be moved to the digital domain after A/D 530, and as the equalizer is a linear filter, it can further be moved to after f 520. Thus we can obtain the circuit configuration 575 shown in FIG. 10. Following similar arguments, we can also simplify the analog and digital architectures in FIGS. 3 and 6 as the one in FIG. 10. The target response T and equalizer f are designed so that the error e 505 in FIG. 8 is minimum. Thus, in an ideal case, the combination of channel response h 515, A/D 530, and the equalizer f 520 can be replaced by T. When we apply this to FIG. 10 we obtain the architecture 600 shown in FIG. 11, and will use this, simplified architecture throughout this document.

Figure 11:
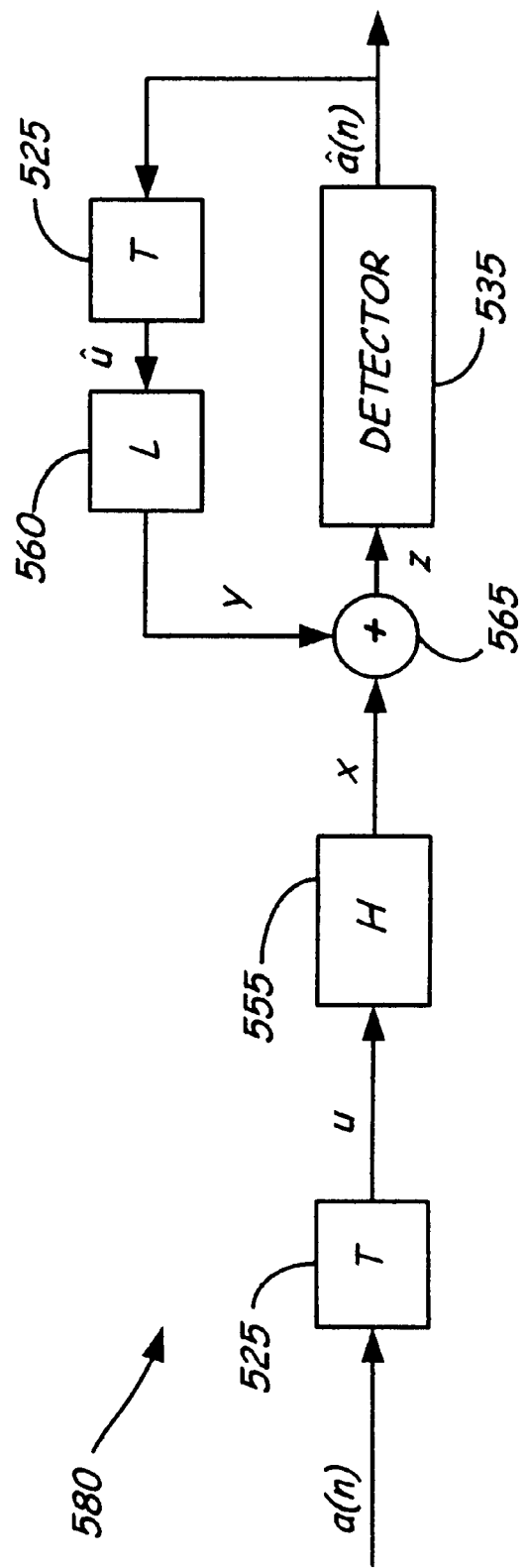
FIG. 11 is a block diagram illustrating a simplified version of the circuitry shown in FIG. 10.

Focusing on the simplified architecture in FIG. 11, we can write:

$$z = x + y = H^*u + L^*\hat{u} = H^*u + L^*(u + e_u) = (H+L)^*u + L^*e_u \quad \text{Equation 3}$$

where $e_u = \hat{u} - u$. The filters H 555 and L 560 are designed so that their additions are very close to unity (or might also be designed to be exactly equal to unity). Thus, we can rewrite the expression for z as:

$$z \approx u + L^*e_u \quad \text{Equation 4}$$

We know that $e_u = \hat{u} - u = T^*(\hat{a} - a)$. If we define $e_a = \hat{a} - a$, then $e_u$ can be expressed as $e_u = T^*e_a$. In Equation 4, replacing u with $T^*a$ and $e_u$ with $T^*e_a$, we get $$z = T^*a + L^*T^*e_a = T^*(a + L^*e_a) \quad \text{Equation 5}$$

If we look at Equation 5 closely, we see that:

(1) When there are no errors in the system (i.e., $e_a = 0$), then we get $z = T^*a$, which is what we want; and
(2) In presence of errors, the contribution of errors to the input of detector 535 is $T^*L^*e_a$.

Thus, in presence of errors, the term $L^*e_a$ will force the detector input to deviate from its ideal value causing more errors. In other words, the term $L^*e_a$ is the source of error propagation. Let's now look at the term $L^*e_a$. It is the convolution of filter L 560 and the error sequence ea. We know that the filter L 560 is a low-pass filter with a very small cutoff frequency. In other words, it only filters the very low frequency content of the error sequence $e_a$. If we look at the signal $e_a = \hat{a} - a$, we see that it takes only values from the set (−2, 0, 2), zero meaning no errors, and −2 (+2) meaning the actual sent bit has value 1 (−1) and it is decided to be −1 (1). As L 560 is a low-pass filter with a very small cut-off frequency, the error sequence $e_a$ should have a considerable amount of low frequency content in order to have the term $L^*e_a$ be comparable with a in Equation 5. This means that it has to have consecutive 2's or −2's. Consecutive 2's or −2's means that the data sent should also have consecutive −1's or 1's. However, as there is RLL (Run Length Limited) code in the system, the number of consecutive +1's or −1's in the data is limited. This means that the RLL code helps reduce the low frequency content of the error sequence $e_a$.

Detecting and Canceling Error Propagation

Figures 1, 17:
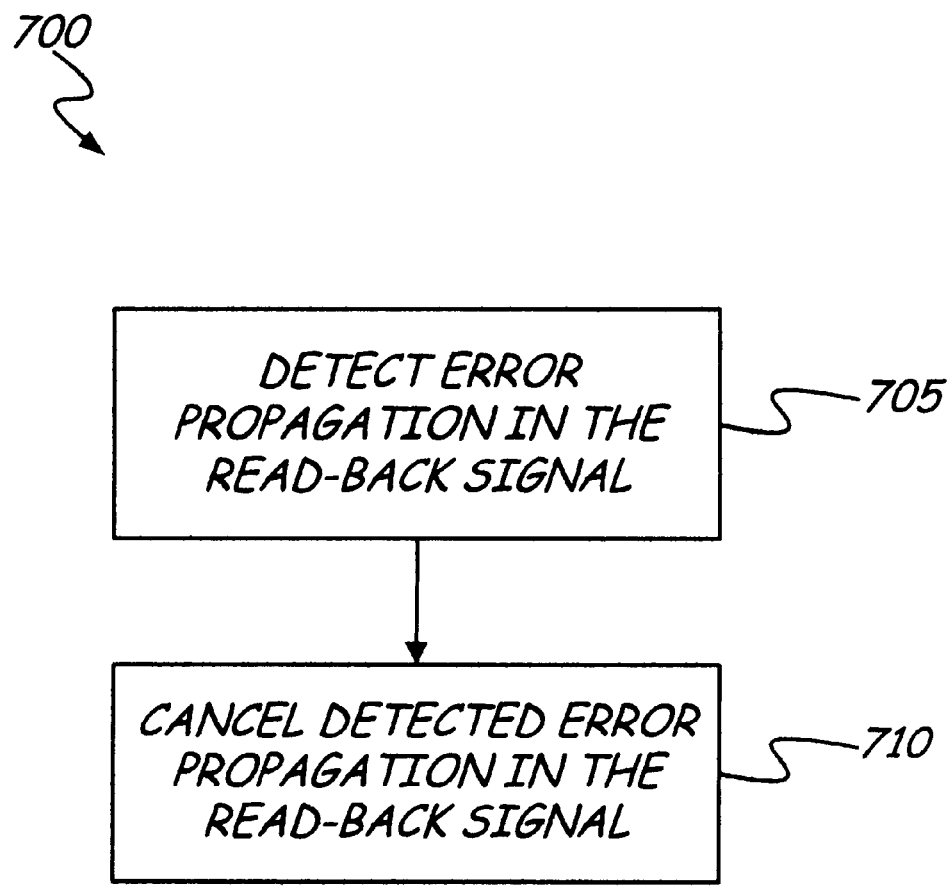
Figures 2, 17:
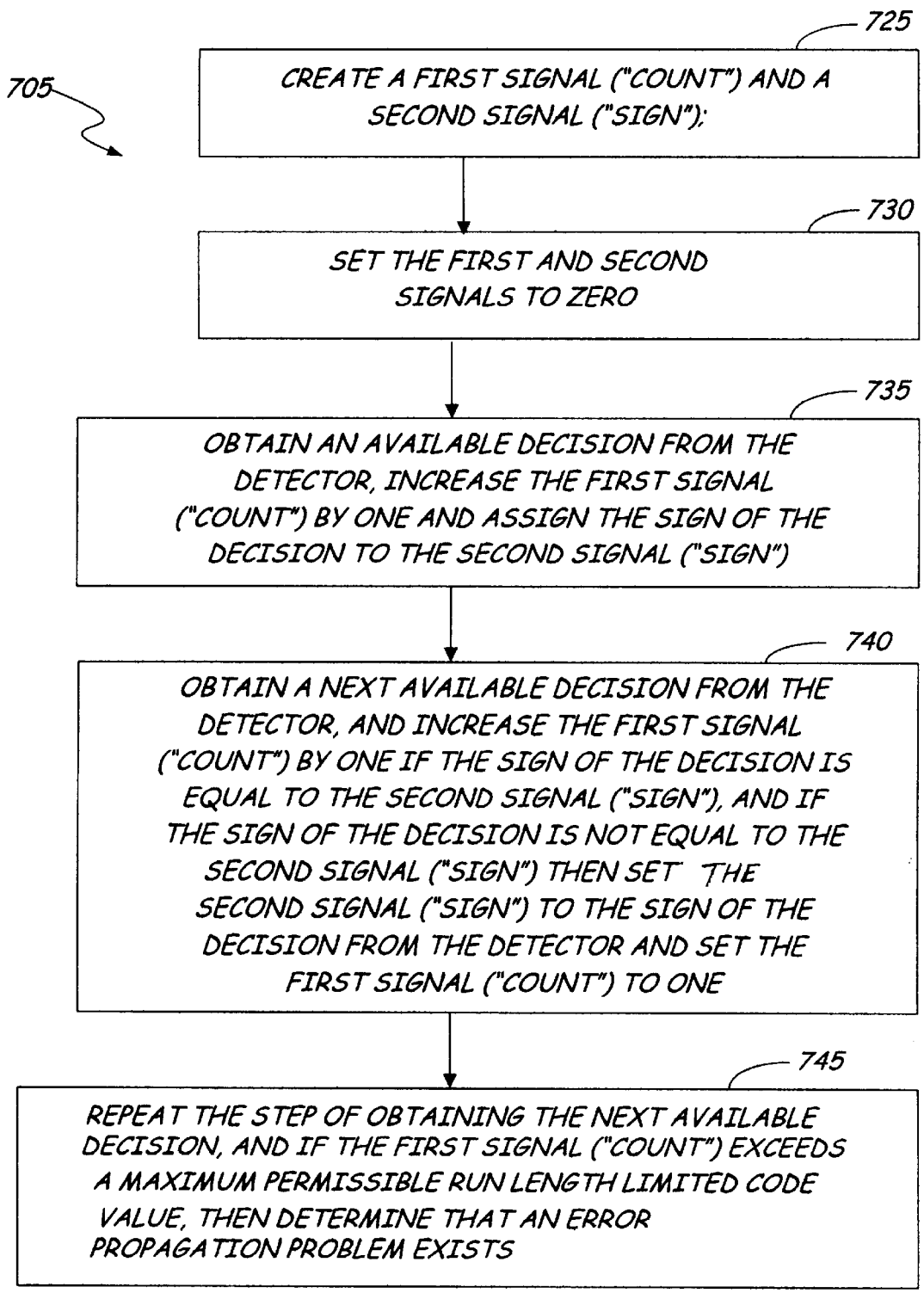
Figures 3, 17:
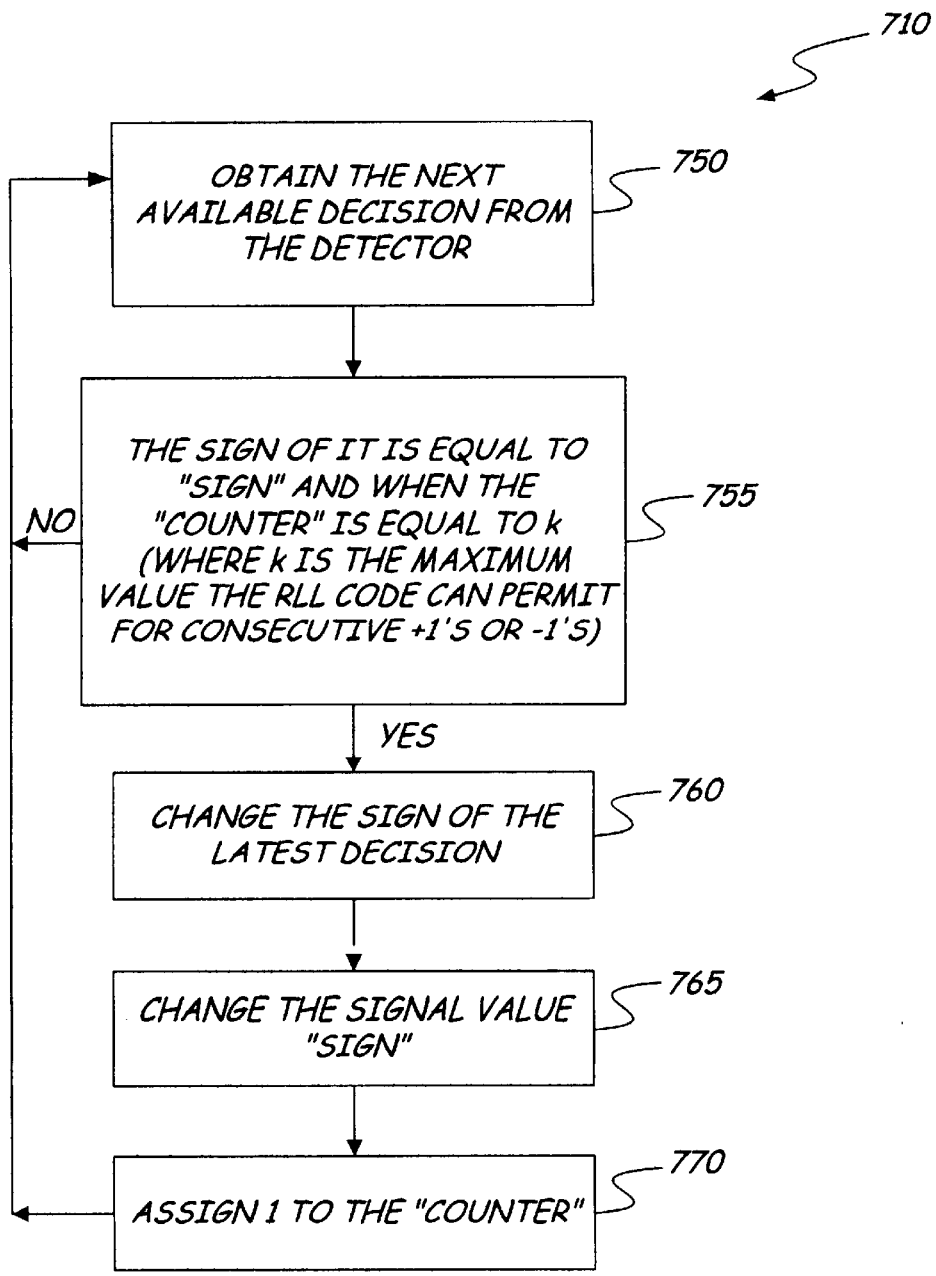

Even if the RLL code helps in reducing the potential error propagation in the system, it does not completely eliminate it. Error propagation may still occur, even if the input data bit stream is RLL coded. To be more instructive, this is explained with an example. Consider the case shown in Table 3 of FIG. 12. Although the input bit stream is RLL coded, the error sequence in Table 3 has low frequency content, and the filter L filters that content, and will cause error propagation. FIG. 17-1 is a block diagram illustrating the general steps of an error detection (step 705) and cancellation (step 710) method of the present invention. More particular embodiments for each of these steps are described below.

Detection of Error Propagation

As can be seen above, RLL codes help reduce the possibility of error propagation, and slow down the process by which error propagation occurs, but they don't stop it completely. Thus, we first detect the possibility of error propagation. Since we don't have the input bit stream, but instead only have the decisions of the detector, only those decisions are used. However, the RLL code in the system is also known. Thus, any decisions which include consecutive +1's or −1's which exceed the limit of the RLL code should be an indication that a problem exists. Thus a detection algorithm 705 as shown in FIG. 17-2 can include the following steps:

(1) Create two signals, for example naming them "count" and "sign". (step 725)
(2) Reset "count" to 0, and "sign" to 0. (step 730)
(3) Obtain the available decision from the detector. Increase "count" by 1, and assign the sign of the decision to "sign". (step 735)
(4) Get the next available decision from the detector. Increase "count" by 1 if the sign of the detector output is equal to the one at "sign". If the sign of the detector output is not equal to the one at "sign", then set the "sign" to the sign of this detector output and assign 1 to the "counter". (step 740)
(5) Iterate the previous item, and check the value of the "counter". When the "counter" exceeds the maximum value the RLL code can permit for consecutive +1's or −1's, it can be determined that a potential problem was detected in the system which may also cause error propagation. (step 745)

Cancellation of Error Propagation

After detecting the error propagation, the next step to be taken should be to try to cancel that error propagation in the system. As is explained in the previous sections, the low frequency content of the error sequence causes the error propagation. An RLL coded input bit stream helps to reduce this low frequency content, but it is also necessary to restrict the detected bit streams according to the RLL code in the system. Thus, the simplest algorithm 710 which helps to cancel error propagation can include the following steps as is shown in FIG. 17-3:

(1) Obtain the next available decision from the detector. (step 750)
(2) If the sign of it is equal to "sign" and when the "counter" is equal to k (where k is the maximum value the RLL code can permit for consecutive +1's or −1's) (step 755):
    (a) Change the sign of the latest decision (step 760).
    (b) Change the signal value "sign" (step 765).
    (c) Assign 1 to the "counter" (step 770).

The algorithm above reduces the low frequency content of the detector decisions, and increases the high frequencies. However, the latest decision might have been the correct one, and the low frequency content might have been due to one of the previous wrong decisions. With the algorithm above, it is possible to still be keeping the wrong decision in the feedback loop, and introducing another wrong decision into the loop. Thus, instead of working with hard decisions, it may be more beneficial to work with the soft decisions, attempting to decide which one is more likely to be wrong by looking at the confidence levels of those soft decisions, and setting the method accordingly. As a first alternative to step 710 illustrated in FIG. 17-3, we disclose the following algorithm (shown in FIG. 13) which works with log likelihood ratios:

(1) Create an array of early log likelihood ratios from the detector. The size of the array is k+1 where k is the maximum number of consecutive +1's or −1's which the RLL code permits.
(2) At every clock cycle, shift the entries of the array to the left by one and enter the most recently obtained log likelihood ratio value to the array from the right. The sign of the leftmost element of the array will be sent to the filter as the decision of the detector.
(3) If all the elements of the array have positive signs or all have negative signs (which means k+1 consecutive +1's or −1's), change the sign of the log likelihood ratio with smallest magnitude (i.e., the log likelihood ratio in which we have the least confidence).

Figure 13:
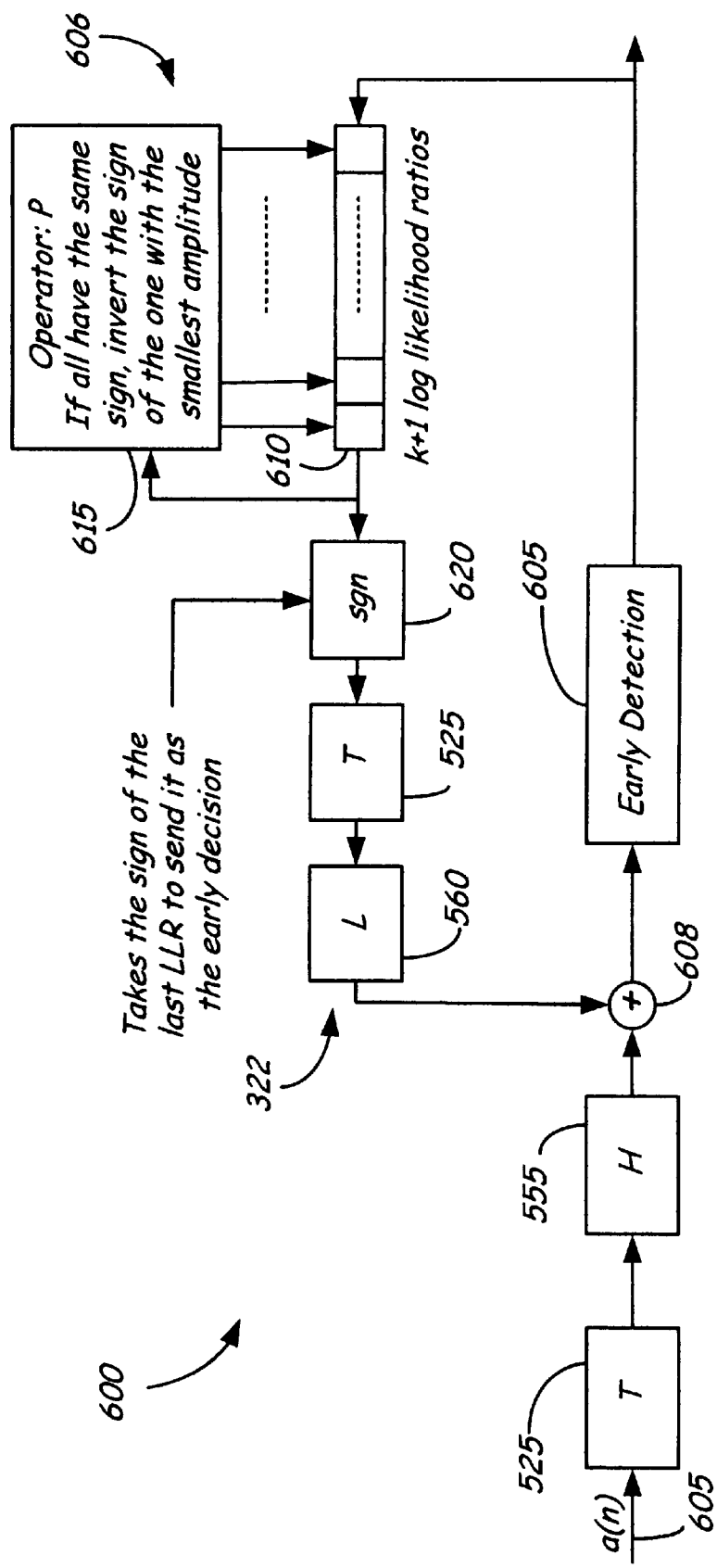
FIG. 13 is a block diagram illustrating an embodiment of an error propagation cancellation architecture in accordance with the present invention.

In the circuit 600 shown in block diagram form in FIG. 13 an input data stream a(n) 605 is provided to target response filter 525, the output of which is provided to high-pass filter 555. The output of high-pass filter 555 is provided to adder 608, along with a feedback signal provided by a feedback path 322 from early detection circuitry 605. Within the feedback path, error propagation cancellation circuitry 606 is included. For error propagation cancellation circuitry 606, the output of the early detector is provided to a register 610 which stores an array of k+1 log likelihood ratios. Log likelihood ratios are an output of the early detector which provides an indication of a likelihood of a particular bit being either a +1 or a −1. The higher the positive number of a log likelihood ratio, the more likely that a particular bit is a +1. The more negative the number of the log likelihood ratio for a particular bit, the more likely it is that the bit is a −1. Log likelihood ratios which are close to zero are more likely to be indicative of a possible error.

Sign determining circuitry 620 identifies the sign of the log likelihood ratios. If all the log likelihood ratios have the same sign, that is a clear indication that something in the system is not operating correctly since the RLL code does not permit strings of bits with the same sign to be longer than a predetermined length. If all of the log likelihood ratios have the same sign, at block or circuit 615, the log likelihood ratio having the smallest amplitude is identified and inverted, then stored in the appropriate portion of register 610. This then also prevents error propagation in the system. Using the sign of the log likelihood ratios as determinable in block 620, a hard decision of the value (+1 or −1) of the bits in the bit stream is made. Thus, the output of sign block 620 is a bit stream which is provided to target response filter 525. The output of target response filter 525 is provided to low pass filter 560 in accordance with the previous discussions. The output of low pass filter 560 is provided to adder 608.

Figure 14:
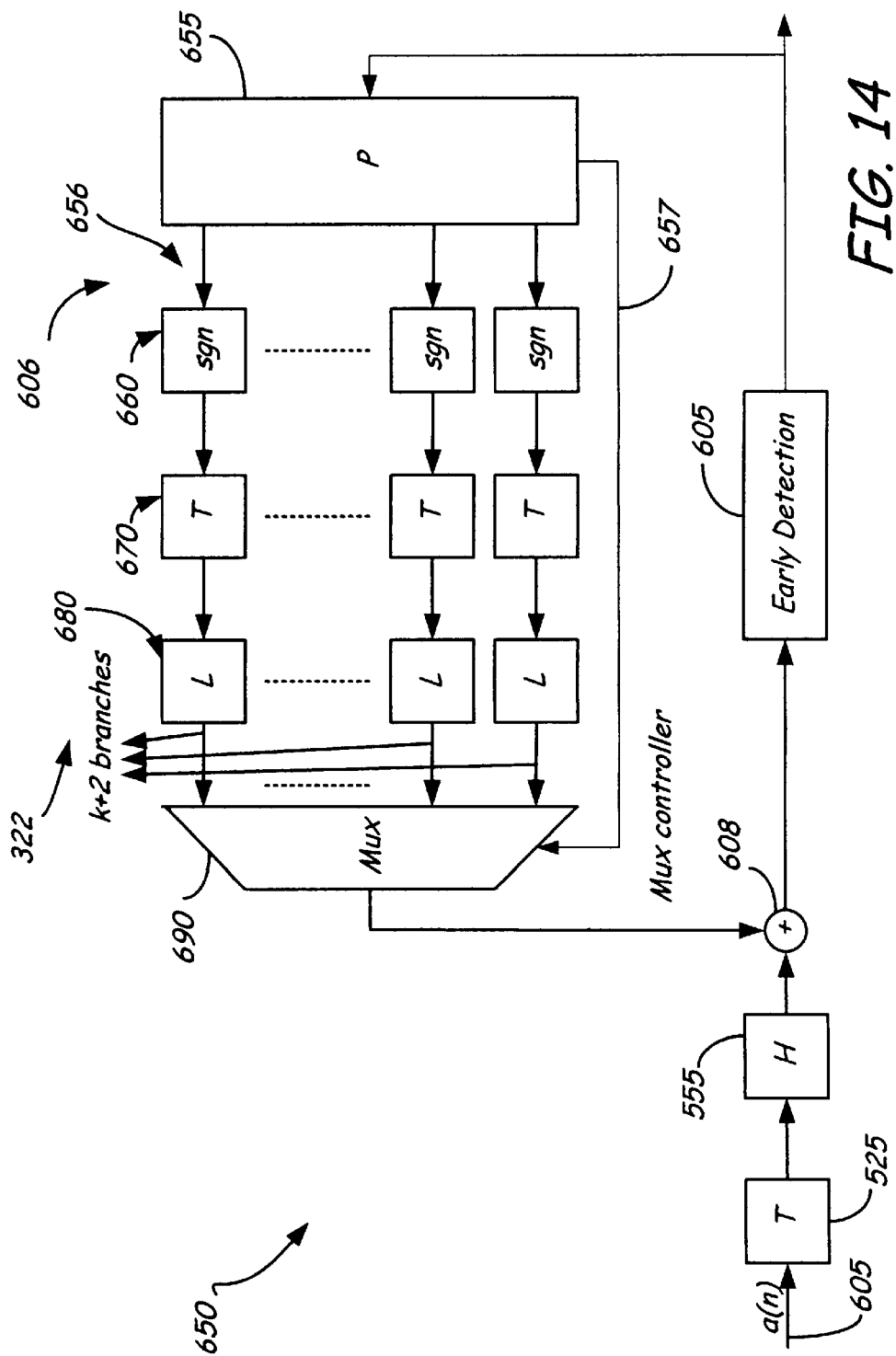
FIG. 14 is a block diagram illustrating another embodiment of an error propagation cancellation architecture in accordance with the present invention.

The architecture shown in circuit 600 of FIG. 13 inserts another k+1 delay elements into the feedback loop, which increases the latency of the loop by k+1. Hence it also decreases the effectiveness of the algorithm proposed for the low frequency noise sources. We can get rid of that k+1 delay elements in the loop at the expense of increasing the implementation cost, adding k+2 processing branches to the feed back loop as shown in alternate algorithm or circuit 650 of FIG. 14, which is disclosed as a second alternative to step 710 shown in FIG. 17-3. Each branch includes a sign circuit or block 660, a target response filter 670, and a low pass filter 680. The processor P 655 in FIG. 14 is configured to implement the following steps:

(1) Create an array of early log likelihood ratios from the detector 605. The size of the array is k+1 where k is the maximum number of consecutive +1's or −1's the RLL code permits.
(2) Initially choose the top branch 656 in FIG. 14 as the main branch.
(3) Take the log likelihood ratio, and always send the sign of it to the sign block or circuit 660 of main branch as the decision.
(4) For the remaining k+1 branches, send the negative of the sign of the recent log likelihood ratio to only one branch, and send the positive of it to the remaining ones.
(5) Change circularly the branch where the negative of the sign of log likelihood ratio is sent so that only one branch contains the negative of a specific log likelihood ratio among the k+1 consecutive ones in the array.
(6) If all the signs of the log likelihood ratios in the array of the main branch are the same, find the branch where the sign of the log likelihood ratio with the least amplitude has been changed before being sent to the corresponding filter T 670 of the branch. Choose that branch as the new main branch.
(7) Reorder the branches so that the new main branch is at the top, the old main branch is just below it, then comes the ones with the negative of the log likelihood ratios at the left most.
(8) Continue to circularly assign the negative of the sign of log likelihood ratio to the branches, starting with the old main branch (new first branch).
(9) The mux controller (processor P 655 and control signal 657) always chooses the main branch for connecting to adder 608.

In order to explain the process better, consider an example. Assume that k=7, then we have an array of size 8, and we will have 9 branches. We initially choose the top branch as our main branch Let the situations at time instants n−2, n−1, and n be as shown in Tables 4, 5, and 6 in FIGS. 15 and 16. Assume that at time n, the signs of $l_1$ through $l_8$ at the main branch are all the same, and among all the others $I_5$ has the least magnitude. Then we choose old "Branch 7" to be our new main branch, our old main branch to be our first main branch, followed by branches 3, 4, 5, 6, then finally branches 8, 1, and 2. The new situation at time n becomes as shown in Table 7. We now guarantee that for the next 4 clock cycles (i.e., up to n+5) there will be at least one $l_x$ implemented at the new main branch with different sign than the others. We continue to assign the negative sign of the most recent $l_8$ circularly to different branches (starting with the new first branch), and implement the filters T 670 and L 680 at those branches using those sequences of decisions.

Thus, three methods to cancel error propagation are discussed The first is the simplest to implement but does not deal with the possibility of a correct wrong decision, in order to reduce the low frequency content of the error sequence. The second method (FIG. 13) improves the first one, and deals with the possibly correct wrong decision in the loop. However, this method introduces extra delays to the feedback loop, increases the latency of the loop which might result in reduction in the performance of the low frequency noise compensation algorithm. The third method (FIG. 14) deals with the extra delays of the second method, and proposes another algorithm which essentially follows the same idea of the second method with no extra delays in the loop. As it does not have the extra delays, it results in better performance for the low frequency noise compensation algorithm. However, it increases the implementation cost compared to the second method Summary Disclosed is an algorithm which includes preprocessing the low frequency components of the perpendicular read-back signal. For this purpose:

(1) We first introduced a dominant known high-pass pole in the system This filters out most of the dominant low frequency noise components in the system, and leaves the system only with the BLW effect which comes from the artificially introduced dominant high-pass pole.
(2) The BLW in the system has mainly two sources, one of them is the number of consecutive +1's or −1's in the input bit stream, and the other one is the dominant high-pass pole. We can get the information about the input bit stream from the detector. Thus, as we know, the dominant high-pass pole and the number of consecutive +1's or −1's in the system, we also know the amount of BLW.
(3) The last step of the algorithm is to get rid of the known BLW effect in the system.
(4) We then disclosed different architectures to implement the algorithm (analog, hybrid, and digital).
(5) We integrated the hybrid implementation of the algorithm to the software channel, and tested it with real data. It was found that the algorithm improves the performance of the overall system.
(6) Finally, the potential error propagation problem of the proposed analog, hybrid, and digital architectures was discussed. Methods to detect and cancel this problem were disclosed.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the encoding method and apparatus while maintaining substantially the same functionality without departing from the scope and spirit of the present invention. In addition, although the embodiments described herein are directed to methods and apparatus for preprocessing a perpendicular recording read-back signal in a disc drive data storage system, it will be appreciated by those skilled in the art that the teachings of the present invention can be applied to other systems, like magnetic tape data storage systems, without departing from the scope and spirit of the present invention.

What is claimed is:

1. A method of preprocessing low frequency components of a perpendicular read-back signal in a data storage system in order to reduce low frequency noise, the method comprising:

introducing a dominant known perturbation, to the perpendicular read-back signal, which masks the effects of other low frequency noise sources and leaves the read-back signal with one dominant low frequency noise component; and removing the dominant known perturbation from the read-back signal to recover low frequency portions of the read-back signal in order to determine values of bits read from a storage medium.

2. The method of claim 1, wherein introducing the dominant known perturbation to the read-back signal further includes filtering the read-back signal using a high-pass filter to introduce a dominant high-pass pole.

3. The method of claim 2, wherein removing the dominant known perturbation from the read-back signal to recover low frequency portions of the read-back signal further comprises filtering decisions of a detector using an estimator of the channel and a low-pass filter.

4. The method of claim 3, wherein filtering decisions of the detector using an estimator of the channel and a low-pass filter further comprises estimating a perpendicular channel impulse response from the decisions of the detector, and low-pass filtering the estimations of the perpendicular channel impulse response.

5. The method of claim 2, wherein filtering the read-back signal using the high-pass filter to introduce the dominant high-pass pole further includes filtering the read-back signal using a high-pass filter having the transfer function of the form:

$$H(z) = 1 - \frac{m}{1-(1-m)z^{-1}}$$

where H(z) is the z-domain representation of the filter.

6. The method of claim 3, wherein filtering decisions of the detector using an estimator of the channel and the low-pass filter further includes filtering decisions of the detector using the estimator of the channel and a low-pass filter having a transfer function of the form:

$$L(z) = \frac{k}{1 - (1-k)z^{-1}}$$

wherein k is dependent upon m.

7. The method of claim 3, wherein filtering decisions of the detector using the estimator of the channel and the low-pass filter further includes estimating a perpendicular channel impulse response from the decisions of the detector and low-pass filtering the estimations of the perpendicular channel impulse response in the digital domain.

8. The method of claim 3, and further comprising:
detecting error propagation in the read-back signal; and
canceling detected error propagation in the read-back signal.

9. The method of claim 8, wherein detecting error propagation in the read-back signal further includes:
creating a first signal ("count") and a second signal ("sign");
setting the first and second signals to zero;
obtaining an available decision from the detector, increasing the first signal ("count") by one and assigning a sign of the decision to the second signal ("sign");
obtaining a next available decision from the detector, and increasing the first signal ("count") by one if the sign of the decision is equal to the second signal ("sign"), and if the sign of the decision is not equal to the second signal ("sign") then setting the second signal ("sign") to the sign of the decision from the detector and setting the first signal ("count") to one; and
repeating the step of obtaining the next available decision, and if the first signal ("count") exceeds a maximum permissible run length limited code value, then determining that an error propagation problem exists.

10. The method of claim 9, and wherein canceling error propagation in the read-back signal further includes:
obtaining a next available decision from the detector; and
if the sign of the obtained decision is equal to the second signal ("sign") and when the first signal ("count") is equal to the maximum permissible run length limited code value, then further comprising:
changing the sign of the latest decision from the detector;
changing the value of the second signal ("sign"); and
assigning the first signal ("count") the value one.

11. The method of claim 8, wherein canceling detected error propagation in the read-back signal further comprises:
creating an array of k+1 early log likelihood ratios from the detector, where k is the maximum number of consecutive +1's or −1's, or +1's or 0's, which the run length limited code permits;
shifting the entries of the array to the left by one and entering the most recently obtained log likelihood ratio value to the array from the right, and also sending the sign of the leftmost element of the array to the estimator of the channel and the low-pass filter; and
if all the elements of the array have positive signs, or if all of the elements of the array have negative signs, changing the sign of the log likelihood ratio with the smallest magnitude.

12. The method of claim 8, wherein canceling detected error propagation in the read-back signal further comprises:
creating an array of k+1 early log likelihood ratios from the detector, where k is the maximum number of consecutive +1's or −1's, or +1's or 0's, which the run length limited code permits;
initially selecting as a main branch a top branch of k+2 processing branches of a feedback loop, wherein each of the processing branches includes sign determining circuit, a target response filter and a low pass filter;
sending the sign of the log likelihood ratio of the main branch to its corresponding sign determining circuit, and for one of the remaining k+1 branches sending the negative of the sign of the recent log likelihood ratio to its corresponding sign determining circuit, and for the others of the remaining k+1 branches send the sign of the recent log likelihood ratio to their respective sign determining circuits;
changing circularly which one of the remaining k+1 branches is sent the negative of the sign of recent log likelihood ratio so that only one of the remaining k+1 branches contains the negative of a specific log likelihood ratio among k+1 consecutive ones in the array;
if all of the signs of the log likelihood ratios in the array of the main branch are the same, then finding the one of the remaining k+1 branches where the sign of the log likelihood ratio with a least amplitude has been changed before being sent to its corresponding target response filter and choosing that branch as a new main branch;
reordering the k+2 branches so that the new main branch is at the top, the old main branch is just below it, followed by the branch with the negative of the recent log likelihood ratio at the left most;
continuing to circularly assign the negative of the sign of recent log likelihood ratios to the branches; and
choosing the main branch for providing a feedback signal.

13. A perpendicular recording data storage system comprising:
a channel providing a perpendicular read-back signal having low frequency noise;
a high-pass filter coupled to the channel which introduces a dominant known perturbation to the read-back signal using a high-pass pole;
a detector which receives the read-back signal having the dominant known perturbation, and which provides decisions based upon the read-back signal;
a feedback loop coupled to an output of the detector, wherein the feedback loop removes the dominant known perturbation from the read-back signal in order to recover low frequency portions of the read-back signal in order to determine values of bits read from a storage medium.

14. The perpendicular recording data storage system of claim 13, wherein the feedback loop includes an estimator which estimates a perpendicular channel impulse response from decisions of the detector, and a low pass filter which filters the estimations of the perpendicular channel impulse response.

15. The perpendicular recording data storage system of claim 14, wherein the feedback loop further includes error propagation cancellation circuitry.

16. The perpendicular recording data storage system of claim 15, wherein the feedback loop is implemented in the digital domain.

17. A perpendicular recording data storage system comprising:
circuitry for providing a perpendicular read-back signal having low frequency noise; and dominant known perturbation means for introducing a dominant known perturbation to the read-back signal which masks the effects of the low frequency noise and for removing the dominant known perturbation from the read-back signal to recover low frequency portions of the read-back signal.

18. The perpendicular recording system of claim 17, wherein the dominant known perturbation means includes a high pass filter which introduces the dominant known perturbation to the read-back signal.

19. The perpendicular recording system of claim 18, wherein the dominant known perturbation means further includes a low pass filter for removing the dominant known perturbation from the read-back signal.

20. The perpendicular recording system of claim 19, wherein the dominant known perturbation means further includes circuitry which cancels error propagation in the read-back signal.

* * * * *

UNITED STATES PATENT AND TRADEMARK OFFICE
CERTIFICATE OF CORRECTION

PATENT NO. : 6,707,624 B2
DATED : March 16, 2004
INVENTOR(S) : Mehmet Fatih Erden et al.

It is certified that error appears in the above-identified patent and that said Letters Patent is hereby corrected as shown below:

Title page,
Item [75], Inventors, please delete "Mehmet Faith Erden" and insert
-- Mehmet Fatih Erden --.

Column 14,
Lines 56 and 67, delete ":" after "form".

Signed and Sealed this

Twenty-fifth Day of May, 2004

JON W. DUDAS
*Acting Director of the United States Patent and Trademark Office*